United States Patent
DeMyer

(10) Patent No.: US 12,258,287 B2
(45) Date of Patent: Mar. 25, 2025

(54) WATER TREATMENT THROUGH OZONE GENERATED FROM AN INVERTIBLE OZONATION CAP ATTACHABLE TO A VESSEL

(71) Applicant: Roving Blue, Inc., Lena, WI (US)

(72) Inventor: Marianna DeMyer, Lena, WI (US)

(*) Notice: Subject to any disclaimer, the term of this patent is extended or adjusted under 35 U.S.C. 154(b) by 949 days.

(21) Appl. No.: 17/020,808

(22) Filed: Sep. 15, 2020

(65) Prior Publication Data

US 2022/0081327 A1    Mar. 17, 2022

(51) Int. Cl.
| | |
|---|---|
| C02F 1/46 | (2023.01) |
| C02F 1/461 | (2023.01) |
| C02F 1/467 | (2023.01) |
| C02F 1/72 | (2023.01) |
| G05B 19/042 | (2006.01) |

(52) U.S. Cl.
CPC ........ C02F 1/4672 (2013.01); C02F 1/46109 (2013.01); C02F 1/725 (2013.01); G05B 19/042 (2013.01); *C02F 2001/46133* (2013.01); *C02F 2201/46115* (2013.01); *C02F 2201/4615* (2013.01); *C02F 2201/46165* (2013.01); *C02F 2201/782* (2013.01); *C02F 2303/18* (2013.01); *C02F 2307/02* (2013.01); *G05B 2219/2605* (2013.01)

(58) Field of Classification Search
CPC ...... C02F 1/32; C02F 1/72; C02F 1/78; C02F 1/46; B01D 26/00; G05B 19/042
See application file for complete search history.

(56) References Cited

U.S. PATENT DOCUMENTS

| | | | | |
|---|---|---|---|---|
| 5,460,705 A | * | 10/1995 | Murphy | C25B 9/19 |
| | | | | 204/255 |
| 2002/0061265 A1 | * | 5/2002 | Conrad | C02F 1/78 |
| | | | | 422/186.2 |
| 2009/0039033 A1 | * | 2/2009 | Kee | C02F 1/78 |
| | | | | 210/192 |

FOREIGN PATENT DOCUMENTS

| | | | |
|---|---|---|---|
| CN | 2403333 Y | * | 11/1999 |
| JP | 3198357 U | * | 7/2015 |
| KR | 20190064185 A1 | * | 6/2019 |

OTHER PUBLICATIONS

Smart Water Generation Device; KR 20190064185 A; Nov. 30, 2017; Cho Ja Ryong (Year: 2017).*

(Continued)

*Primary Examiner* — Walter D. Griffin
*Assistant Examiner* — Cameron J Allen
(74) *Attorney, Agent, or Firm* — Peter Jensen-Haxel

(57) ABSTRACT

Disclosed is a method, a device, and/or a system of water treatment through ozone generated from an invertible ozonation cap attachable to a vessel. In one embodiment, a cap for treating water inside a vessel includes an exterior surface of the cap, a fastener for attaching the cap to an opening of the vessel, a power source, an electrolytic ozone generator comprising an electrode that generates dissolved ozone and/or ozone gas when both the electrode is exposed to the water and a current from the power source is applied to the electrode, and an interior surface of the cap that exposes an anode of the electrode such that the water inside the vessel can contact the anode when the cap is inverted such that the dissolved zone and/or ozone gas rises up through the water of the vessel for increased water treatment effectiveness.

20 Claims, 14 Drawing Sheets

(56) References Cited

OTHER PUBLICATIONS

Simple Device for Generating Electrolytic-type Hydrogenous Water for Preparing E.g. Tea, Comprises Electrolytic-type Hydrogenous Water-generation Portion Which Converts Raw Water Into Hydrogenous Water, Fuselage Portion and Cap Portion; JP 3198357 U; EDA T (Year: 2015).*

A Water Dispenser for Self-purifying Water Storage Bottle; CN 2403333 Y; Nov. 1, 2000; Boa, Zhen-hua (Year: 2000).*

* cited by examiner

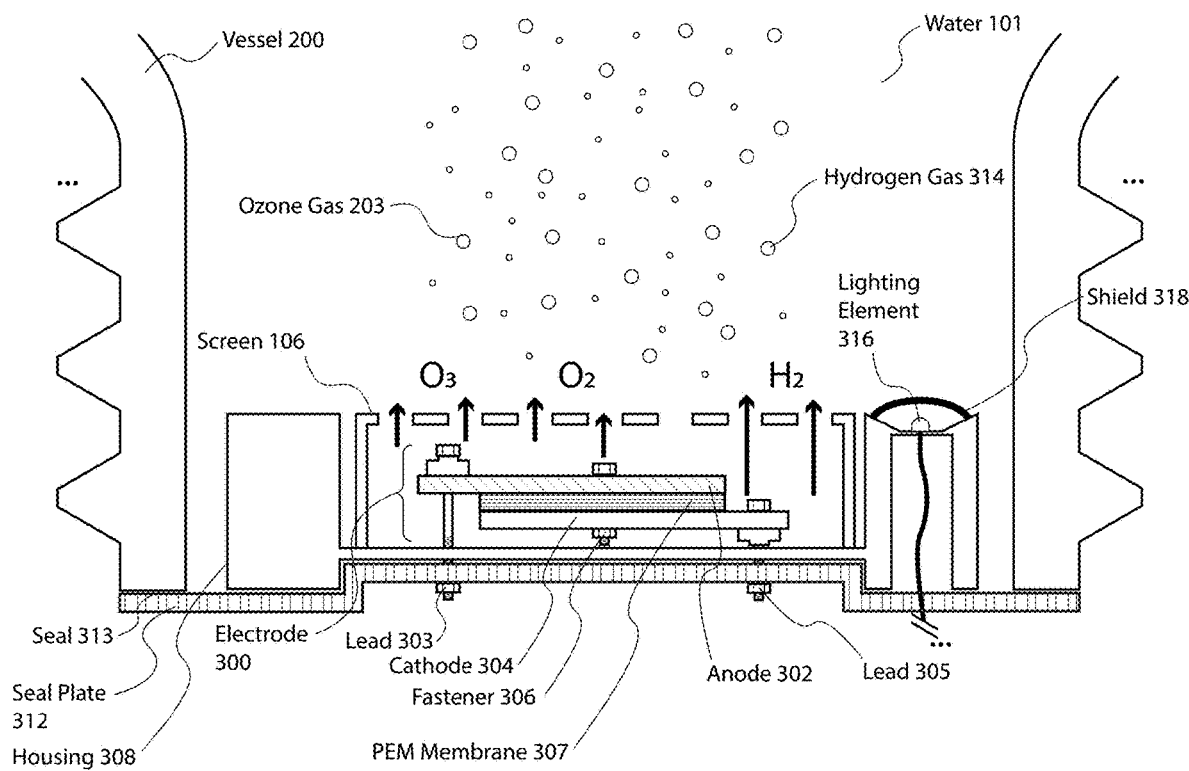
FIG. 3A  Electrolytic Ozone Generator View 350A

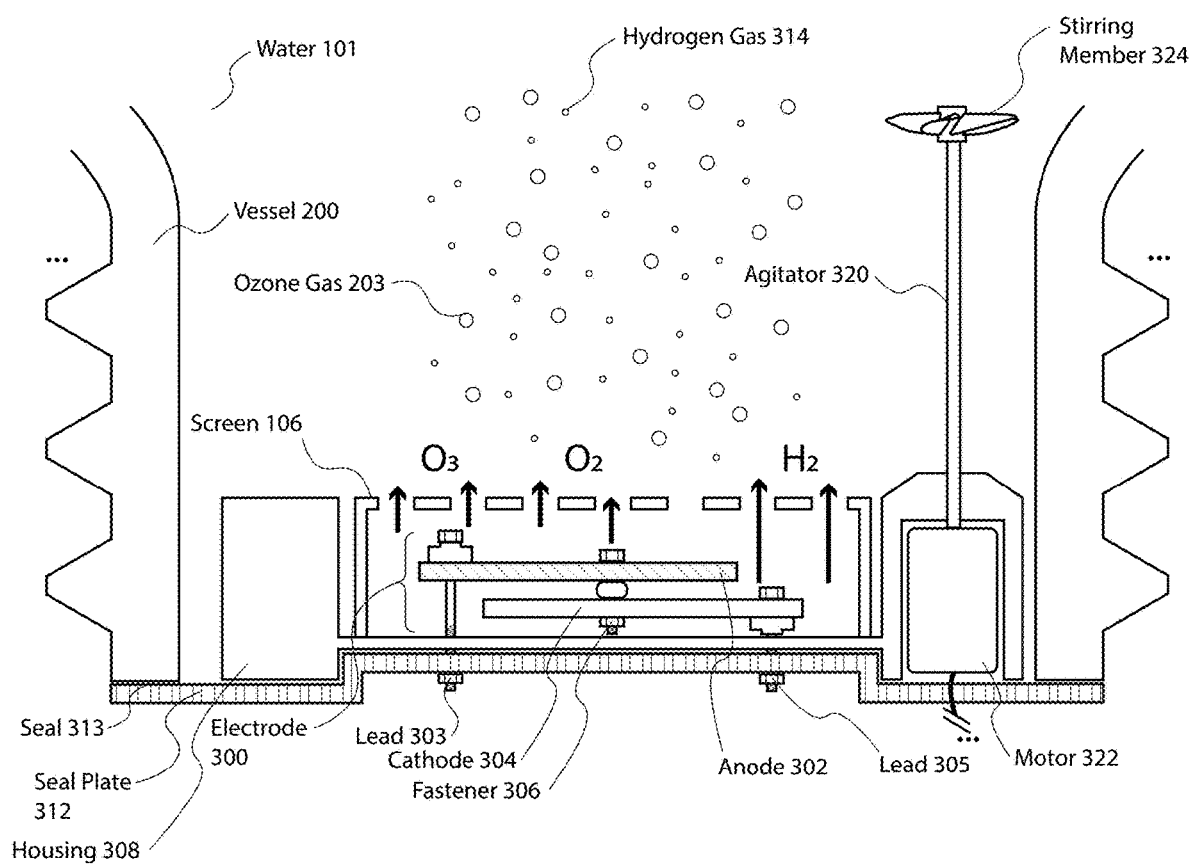
FIG. 3B  Electrolytic Ozone Generator View 350B

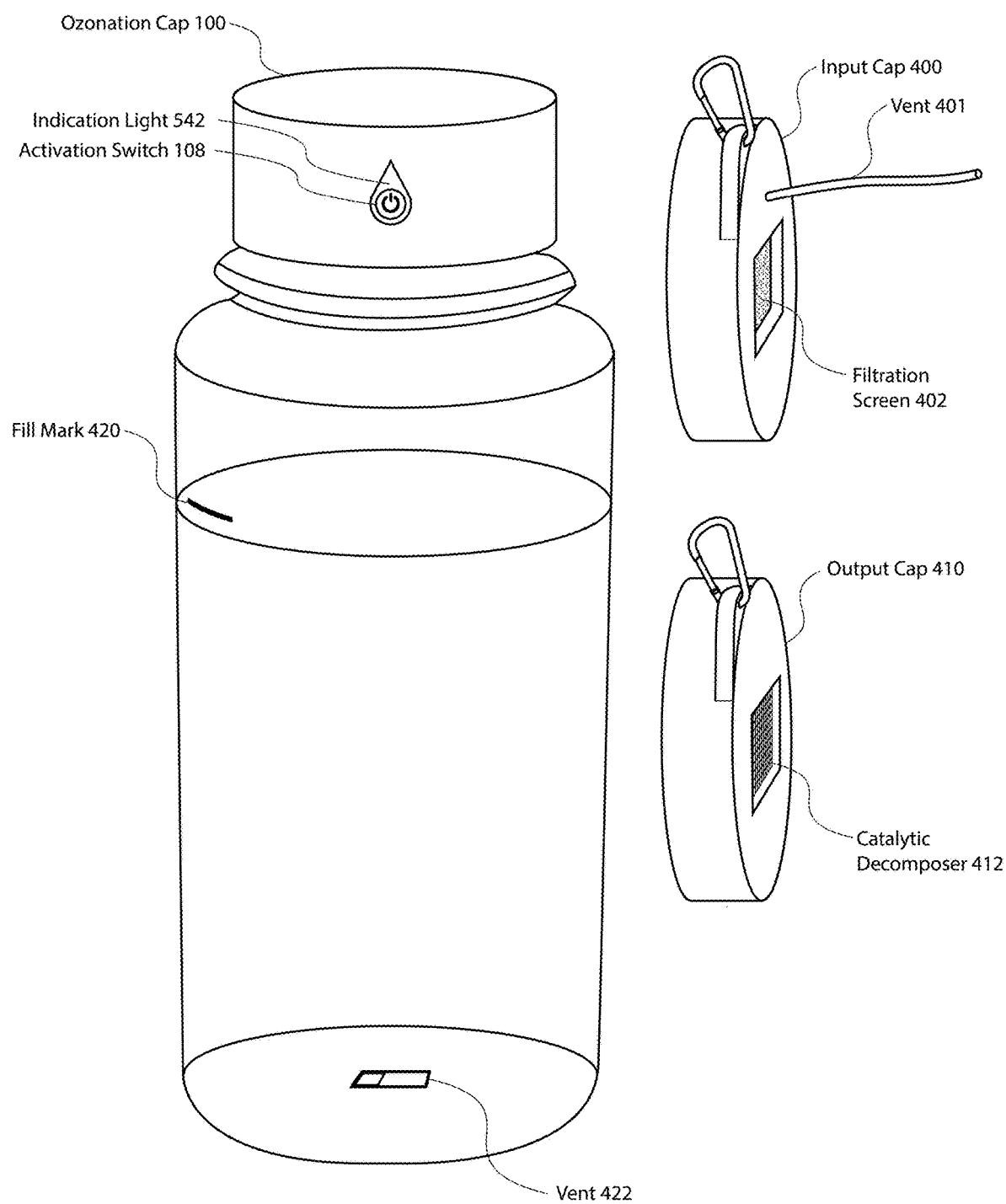
FIG. 4    Treatment Augmentations 450

FIG. 6  Water Treatment Process Flow 650

Activation Process Flow
750

FIG. 8  Treatment Process Flow 850

FIG. 9 Treatment Process Flow 950

*FIG. 10*  Treatment Process Flow 1050

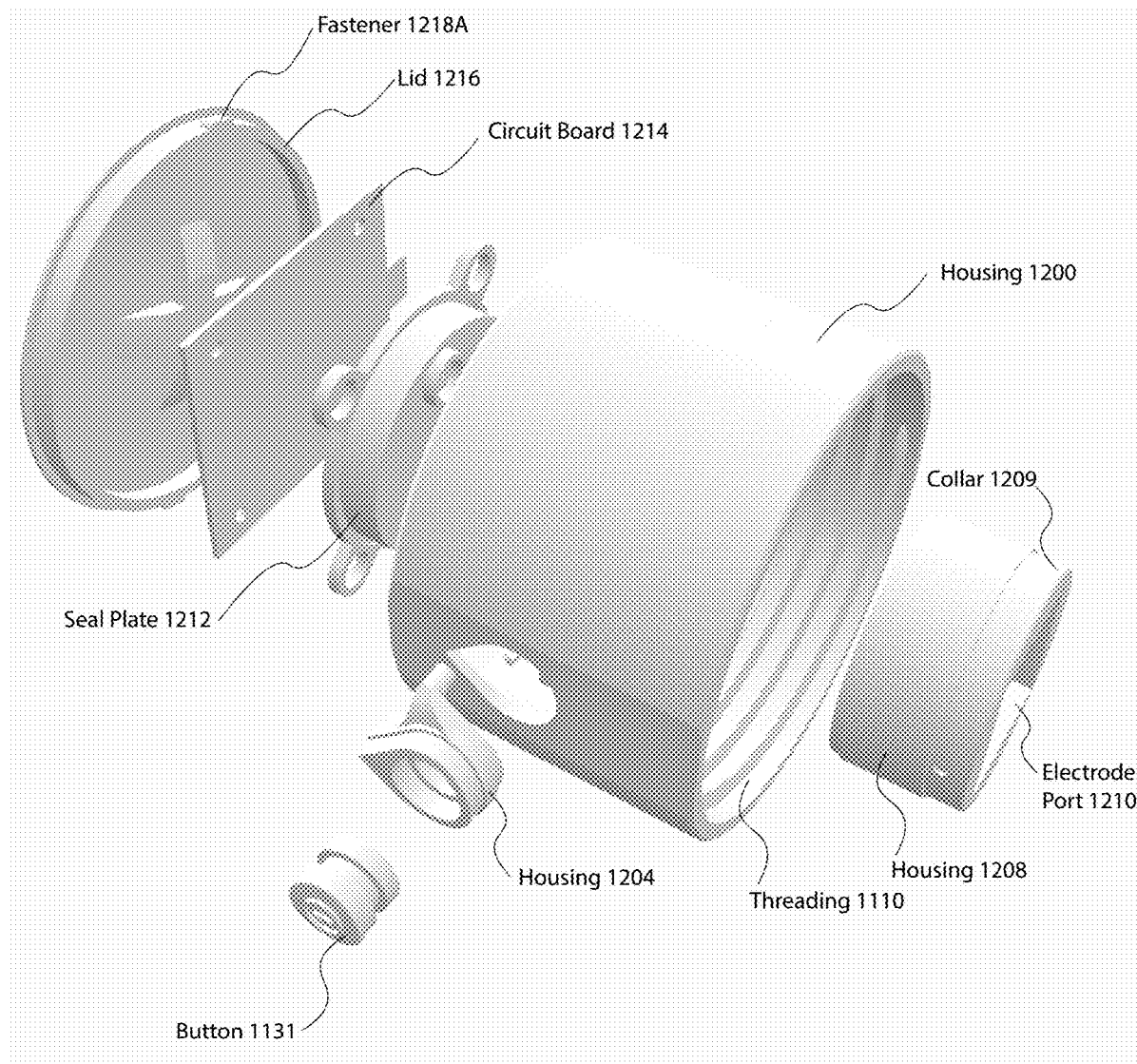
FIG. 12  Cap Structure Exploded View 1250

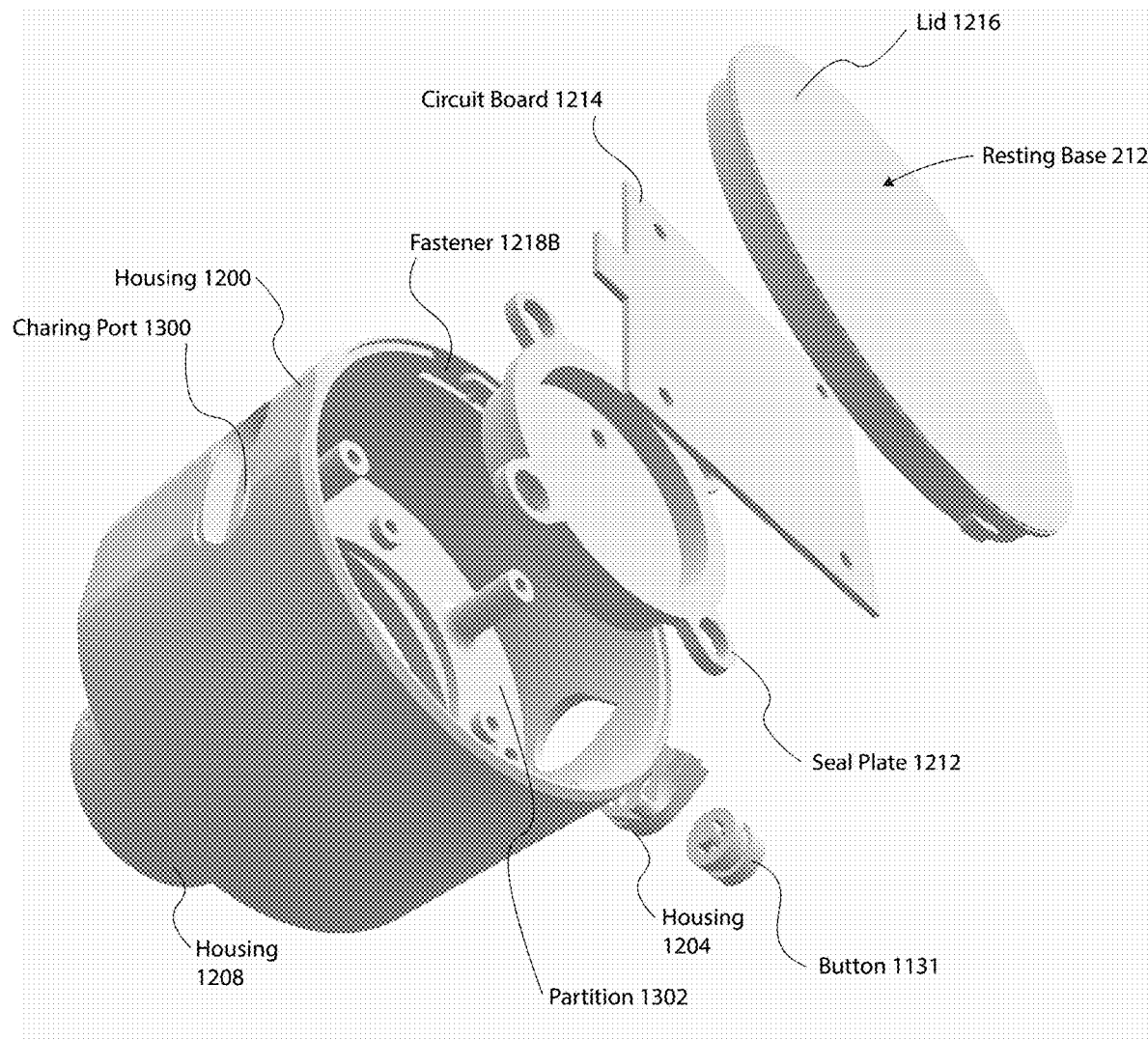
FIG. 13  Cap Structure Exploded View 1350

WATER TREATMENT THROUGH OZONE GENERATED FROM AN INVERTIBLE OZONATION CAP ATTACHABLE TO A VESSEL

FIELD OF TECHNOLOGY

This disclosure relates generally to water treatment and, more particularly, to a method, a device, and/or a system of water treatment through ozone generated from an invertible ozonation cap attachable to a vessel.

BACKGROUND

Clean water may be difficult to find in locations that are remote such as wilderness, in places that lack adequate infrastructure such as developing nations, and during emergencies such as natural disasters. For example, on-site production of clean water production may be important for recreational hikers, workers with remote field work, villagers in developing nations, and organizations such as the United States military or non-profit humanitarian organizations.

One strategy for on-site water production is the use of filters, for example an activated carbon filter. Some filters may have certain disadvantages, for example requiring mechanical pumping and sometimes relatively bulky equipment. Another strategy for on-site water purification is chemical treatment, for example treating water with bleach or iodine compounds. However, some chemical treatments have certain disadvantages, for example generating halogenated carbon derivates (some of which may be carcinogenic) and leaving an unpleasant taste or smell. Yet another strategy for on-site water production may be the use of ultraviolet light, for example from a small hand-held device that is used to stir water or larger devices which may pass water over a UV light. However, devices using UV light may also have some disadvantages. For example, UV light may primarily function by "inactivating" pathogens through DNA damage (e.g., as opposed to organism oxidation) which may require significant contact time. UV light may have little effect on other organic molecules that a user may wish to treat in the water (e.g., organic toxins, odorous molecules, etc.). UV light may also pose a hazard to the eyes if not properly shielded.

Another strategy for on-site water treatment is the use of in-situ ozone production. Ozone is a powerful oxidant with many applications across many industries. For example, ozone is utilized as an antiseptic, disinfectant, water treatment, cleaning agent, commercial bleaching agent, and chemical reagent. Advantages of ozone for portable water treatment may include its strong oxidizing capability, relatively short lifespan, its inability to turn into halogenated carbon compounds, and similarly its decomposition into non-toxic diatomic oxygen gas. Ozonated water can also be used for many purposes such as wound disinfection (e.g., to treat an injury during hiking), scent-masking (e.g., for hunting), and as a general cleaning agent (e.g., for camping and/or for in-home use).

However, in-situ ozone generation can also pose challenges. For example, ozone may not be inherently soluble in water, and may tend to rise as small gas bubbles where the ozone may escape the water being treated, decreasing the dissolved ozone concentration and therefore treatment effectiveness. Ozone concentration can also be difficult to sense in small treatment devices and systems. For example, it may be difficult for a user to know, for a given body of water to be treated, how long an ozone generator should run and/or how long to let the water "rest" for effective and/or safe treatment. At the same time, overproduction of ozone is not efficient, as portable systems may depend on a battery, the overuse of which may reduce the number of uses in the field.

Portable water treatment devices, systems, and methods are important technology, without which people may be inconvenienced or may, at worst, even be put at risk of disease or death. While ozone provides an advantageous approach to water treatment, new and improved methods of water treatment through in-situ ozone production are desirable to further improve its reliability, usability, and effectiveness.

SUMMARY

This disclosure relates generally to water treatment equipment and, more particularly, to a method, a device, and/or a system of treatment of water treatment through ozone generated from an invertible ozonation cap attachable to a vessel.

In one embodiment, a cap for treating water inside a vessel includes an exterior surface of the cap, a fastener for attaching the cap to an opening of the vessel, a power source, an electrode that generates ozone gas when both the electrode is exposed to the water and a current from the power source is applied to the electrode, and an interior surface of the cap that exposes an anode of the electrode such that the water inside the vessel can contact the anode when the cap is inverted and further such that the ozone gas rises up through the water of the vessel for increased water treatment effectiveness.

The cap may also include an activation switch that when activated supplies the current to the electrode and a timer that when expiring stops the current to the electrode. The cap may include a surface attachment means enabling fixation of the cap in an inverted position and a resting base enabling resting of the cap on a level surface in the inverted position.

The cap may include a lighting element attached to the cap and configured to illuminate the water inside the vessel for visible indication of generation of the ozone gas by the electrode. The cap may further include a proton exchange membrane electrically coupling the anode and a cathode of the electrode to enable ozonation of water having a low electrolyte concentration. A motion sensor may also be included for determining a motion of the cap during treatment of the water inside the vessel, where the motion of the cap may be indicative of an agitation level of the water inside the vessel. An indicator light may be configured to visually indicate expiration of a timer, activation of the electrode, the agitation level of the water, and/or an operational status of the electrode.

An orientation sensor may be configured to sense an orientation and/or a rotation angle of the cap. A rotation switch may be configured to enable the current to be supplied to the electrode upon the orientation and/or the rotation angle exceeding a threshold rotation angle. The lighting element may automatically illuminate the water upon activation of the electrode. The attachment means may be a threading, a friction fit, and/or a clasp. The exterior surface may have a grip. The electrode may include nickel-tin oxide and/or boron-doped diamond. The lighting element may be set in the interior surface of the cap and/or configured to shine light through the interior surface of the cap. The motion sensor may include an accelerometer. The power source may be a battery. The timer can be calibrated to a water type, an electrolyte concentration, a water conductivity, a dissolved solid concentration, a water volume, and/or a vessel size.

The cap may also include a computer memory including computer readable instructions that when executed on a computer processor: receive a calibration input that is a water type, a water volume, and/or a vessel size; initiate a timer upon activation of the electrode; automatically deactivate the electrode upon expiration of the timer; and/or illuminate a lighting element in response to activation of the electrode. The cap may also include a computer memory including computer readable instructions that when executed on a computer processor: determine that a motion value of the cap stored in the computer memory has exceeded a threshold motion value; activate an indicator to indicate the water of the vessel has achieved an agitation level inferred from the motion value; determine that a rotation angle of the cap and the vessel has exceeded a threshold rotation value; and/or enable activation of the electrode when the rotation angle of the cap stored in the computer memory has exceeded the threshold rotation value.

In another embodiment, a bottle for treatment of water, includes a vessel for holding a water, a power source, a cap detachable from the vessel that forms a seal with the vessel is attached. The cap includes an electrode coupled to the power source that generates an ozone when the electrode is exposed to the water and a current from the power source is applied to the electrode. The anode of the electrode is exposed to an interior of the vessel such that ozone gas propagates into the water of the vessel when the bottle is oriented in an inverted position relative to an opening of the vessel to which the cap is attachable.

The bottle may include a surface attachment means and a resting surface permitting the bottle to rest in the inverted position.

The bottle may include an output cap detachable from the bottle including a catalytic decomposer that decomposes the ozone when the water of the vessel moves through an opening of the output cap, and/or an input cap detachable from the bottle including a filter for filtering the water added to the vessel. The bottle may further include a vent openable in the bottle configured to vent the ozone and/or a hydrogen produced by the electrode when the bottle is in the inverted position.

In yet another embodiment, a method includes attaching to a vessel containing water to a cap, where the cap includes an electrode coupled to a power source capable of generating an ozone when the electrode is exposed to the water and a current is applied to the electrode. The method includes rotating the vessel until the water contacts an anode of the electrode, and also includes activating the electrode by applying the current from the power source to generate ozone gas that rises while the vessel remains rotated.

The method may initiate through execution of computer readable instructions on a computer processor a timer upon activation of the electrode, and automatically deactivate through execution of computer readable instructions on a computer processor the electrode upon expiration of the timer.

The method may illuminate the water in the vessel through execution of computer readable instructions on a computer processor in response to generation of the ozone gas rising in the vessel when the vessel is rotated. The method may further include determining through execution of computer readable instructions on a computer processor that a motion value of the cap stored in a computer memory has exceeded a threshold motion value. Execution of computer readable instructions on a computer processor may then activate a first indicator to indicate the water of the vessel has achieved an agitation level inferred from the motion value. It may also be determined through execution of computer readable instructions on a computer processor that a rotation angle of the cap stored in the computer memory has exceeded a threshold rotation value. Activation of the electrode may then be enabled when the rotation angle of the cap stored in the computer memory has exceeded the threshold rotation value.

The method may include receiving through execution of computer readable instructions on a computer processor a calibration input that is at least one of a water type, a water volume, and/or a vessel size. The first indicator and/or a second indicator may be activated to visually indicate expiration of the timer, activation of the electrode, and/or an operational status of the electrode.

The method may filter an input water transferring into the vessel. Alternatively, or in addition, at least a portion of the ozone in water transferring out of the vessel may be catalytically decomposed. The catalytic decomposition may include passing the water through a mesh including at least one of platinum and palladium.

Hydrogen gas may be vented from the vessel. The illumination of the water may include light from a lighting element that is set in the interior surface of the cap and/or configured to shine light through the interior surface of the cap. The motion value may be sensed with an accelerometer. The power source is a battery, and the timer can be calibrated to the water type, the water volume, and/or the vessel size.

BRIEF DESCRIPTION OF THE DRAWINGS

The embodiments of this disclosure are illustrated by way of example and not limitation in the figures of the accompanying drawings, in which like references indicate similar elements and in which:

FIG. 3A illustrates an instance of an ozone generator that is an electrolytic ozone generator including an electrode, the electrode protected by a screen and stored in a housing of the cap sealed with a seal plate that is waterproof, and further illustrates optional use of a lighting element set in the housing to enhance visual confirmation of operation of the electrode and/or to act as an indicator light for one or more aspects of operation, according to one or more embodiments.

FIG. 3B illustrates another example of an electrolytic ozone generator, further comprising an agitator optionally extending from the cap to assist in agitating the water, according to one or more embodiments.

FIG. 4 illustrates one or more treatment augments that may further optionally enhance use of the cap of FIG. 1, including a fill mark to ensure an airgap when the bottle is rotated and/or inverted, an input cap comprising a filtration screen for pre-filtering the water, and an output cap comprising a catalytic decomposer for decomposing ozone before use, according to one or more embodiments.

FIG. 12 illustrates a cap structure exploded view of the cap of FIG. 11, including a main housing, a housing for the electrode including an electrode port for exposing an anode of the electrode to the water in the vessel, a seal plate for preventing water intrusion into a cavity of the main housing, a circuit board, and a lid, according to one or more embodiments.

FIG. 13 illustrates another cap structure exploded view of the cap of FIG. 11, further illustrating each of the components in FIG. 12 along with an opening in the main housing for a charging port, according to one or more embodiments.

Other features of the present embodiments will be apparent from the accompanying drawings and from the detailed description that follows.

DETAILED DESCRIPTION

This disclosure relates generally to water treatment and, more particularly, to a method, a device, and/or a system of treatment of water treatment through ozone generated from an invertible ozonation cap attachable to a vessel. Although the present embodiments have been described with reference to specific example embodiments, it will be evident that various modifications and changes may be made to these embodiments without departing from the broader spirit and scope of the various embodiments. Throughout the present embodiments, the ozonation cap 100 is referred to interchangeably as "cap 100". Likewise, the ozonation cap 1100 may be referred to as the cap 1100, etc.

Figure 1:
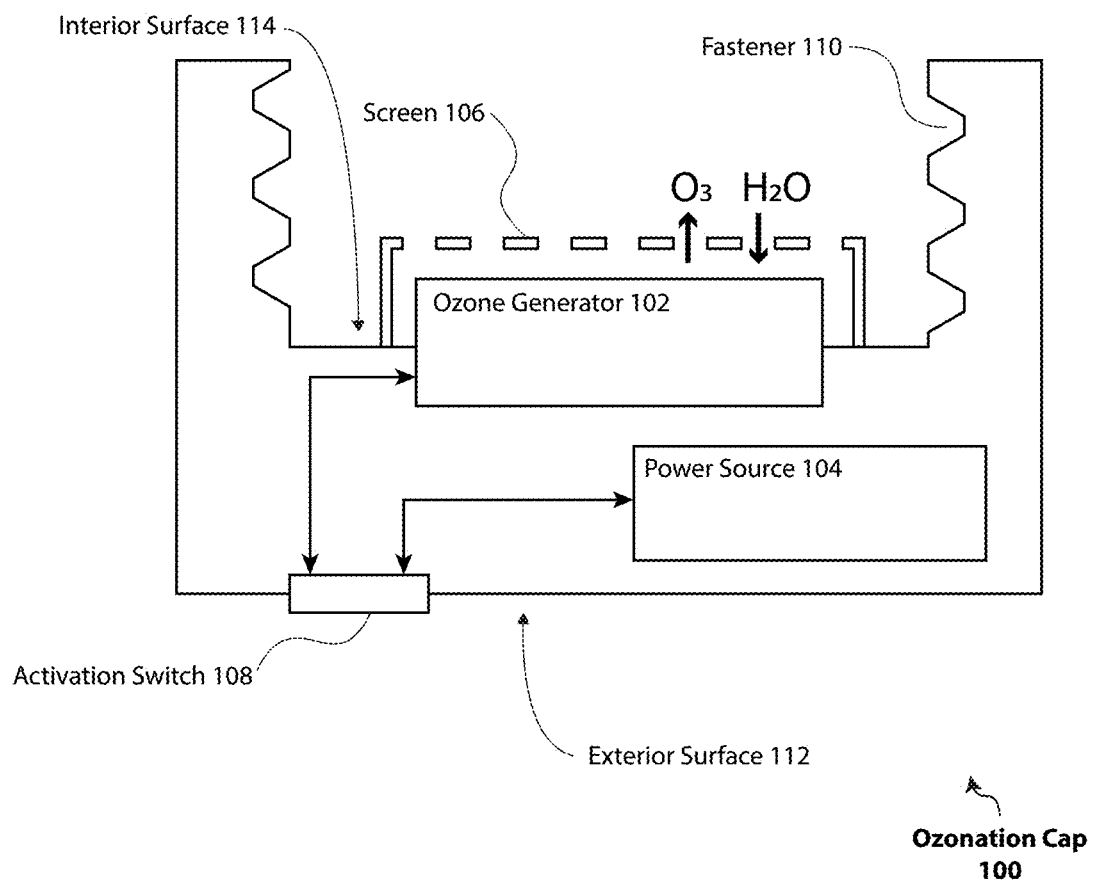
FIG. 1 illustrates a cap for generating ozone, the cap capable of fastening to a vessel containing water to be treated and the cap comprising an ozone generator, a power source, and an activation switch, the cap able to be rotated and/or inverted with the vessel to agitate the water and/or increase the flow of ozone through the water, according to one or more embodiments.

FIG. 1 illustrates an ozonation cap 100 for treating water 101 with ozone 103, according to one or more embodiments. The cap 100 may be used as a portable, adaptive, and easy to use water treatment method, according to one or more embodiments. The cap 100 comprises an ozone generator 102, (for example a coronal discharge ozone generator that may convert diatomic oxygen to ozone gas) and/or an electrolytic ozone generator (e.g., the electrode 300 of FIG. 3) that may produce aqueous ozone and/or ozone gas when supplied with an electric current. The ozone generated by the ozone generator 102 is herein referred to as the ozone 103, whether gaseous, aqueous (i.e., dissolved), or in another form. The ozone gas 203 specifically refers to ozone 103 in a gaseous state, for example bubbles moving through the water 101 (although the gaseous state may be in equilibrium with, and/or rapid transition between, an aqueous state). The water to be treated inside a vessel is herein referred to as the water 101. The ozone generator 102 is electrically coupled to a power source 104, for example a battery (e.g., the battery 570 of FIG. 5) and/or another power source (e.g., a plug for a 24V direct current solar array and/or an alternating current 110V 60 Hz wall socket). An activation switch 108, when activated, supplies a current from the power source to the ozone generator 102. The ozone generator 102 may be protected by a screen 106 which may permit the water 101 to come in contact with the ozone generator and/or the ozone 103 to leave the ozone generator 102 to be dispersed in the water 101.

The cap 100 includes an exterior surface 112 which is a surface of the cap 100 exposed when the cap 100 is fastened to the vessel. As shown and described in one or more of the present embodiments, the exterior surface 112 may include, for example, a lanyard for attachment of a clip (e.g., as shown and described in conjunction with FIG. 4), a grip to assist a user in fastening or unfastening the cap 100, one or more elements of a control interface (e.g., the control interface 530 of FIG. 5), and/or one or more elements of an indicator interface (e.g., the indicator interface 540 of FIG. 5). The cap 100 also includes an interior surface 114, which is a surface of the cap 100 exposed to the water 101 when the cap 100 is fastened to the vessel. As shown and described in one or more of the present embodiments, the interior surface 114 may include one or more components of the ozone generator 102, a lighting element (e.g., the lighting element 316 of FIG. 3) or translucent portion for transmission of light, and/or one or more sensors (e.g., the water sensors 550 of FIG. 5).

The cap 100 may include a fastener 110. The fastener 110 may be a closure for the vessel as may be known in the art of bottle, can, and/or container design and engineering. The fastener 110 may be based on a threading, a friction fit, and/or a clasp. The threading on the vessel may be internal or external to the opening 201 of the vessel 200. The clasp may utilize pressure to hold the cap 100 and the vessel 200 together, including utilizing one or more connecting points on the cap 100 and/or the vessel to hold both together. The clasp may grip the vessel 200 and/or a neck of the vessel 200 or another feature. The fastener 110 may operate similarly to a cork (e.g., which may operate as a friction fit), including without limitation providing a tight friction through a smooth compressible surface and/or ribbing. The fastener 110 may even be based on closures such as a lighting-type closure or a stopper. In one or more embodiments, the fastener forms a seal (e.g., the seal 313 of FIG. 3) that is watertight between the cap 100 and the vessel 200.

The screen 106 may be a protective barrier sufficient to protect components of the ozone generator 102 and/or other delicate components from dirt or damage, while permitting water 101 and/or ozone gas 203 exchange between the ozone generator 102 and the water 101 of the vessel 200. The screen 106 may be made out of a metal mesh and/or a cast or stamped sheet, and is preferably a corrosion resistant material (e.g., suitable plastics, stainless steel) due to exposure to the water 101 and the ozone 103. Example uses of the cap 100 are illustrated throughout the present embodiments, including FIG. 2A and FIG. 2B.

Figures 2A, 2B:
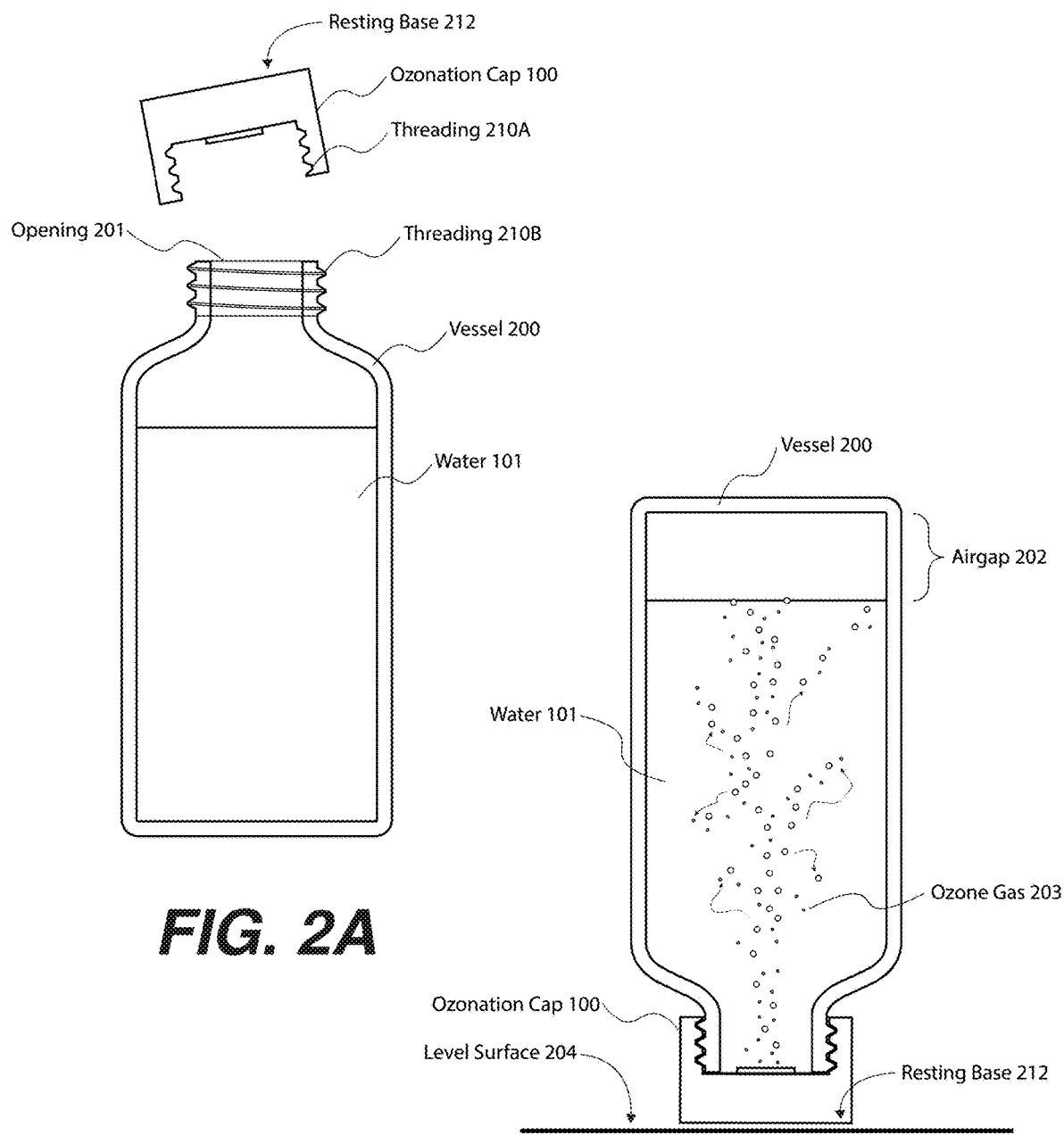
FIG. 2A illustrates the cap of FIG. 1 capable of fastening to an opening of a vessel with threading to form what is referred to herein as a bottle, according to one or more embodiments.
FIG. 2B illustrates inversion of the bottle of FIG. 2A, the inversion causing agitation of the water in the vessel, permitting visual confirmation of the operation of the ozone generator, and/or enhancing movement of the ozone gas through the water, according to one or more embodiments.

FIG. 2A is a bottle assembly view 250 illustrating the cap 100 of FIG. 1 capable of fastening to an opening 201 of a vessel 200 with threading 210 to form a bottle, according to one or more embodiments. The vessel 200 may be a container suitable for holding water or liquid, for example made from metal, glass, plastic, ceramic, and/or composites. For example, the vessel 200 may be a metal water bottle, a plastic Nalgene® water bottle, glass mason jar, etc. The vessel 200 may also be much larger, for example a five-gallon bucket, a seven-gallon portable water container, etc. The vessel 200 may be transparent, translucent, or opaque. However, in one or more embodiments a portion of the vessel 200 and/or the cap 100 is substantially transparent or otherwise permits viewing of the ozone 103 generated by the ozone generator 102 to provide visual confirmation of correct operation and/or ozone 103 product to the user.

In one or more embodiments, the vessel 200 may have a plain cap used for sealing the vessel 200, for example as may be sold with the vessel, whereas the cap 100 may be sold separately and utilize common standards for the fastener 110 and/or the threading 210. For example, the cap 100 fit standard or proprietary specifications for the threading 210. The threading 210A may refer to the threading on the cap 100, and the threading 210B may refer to the threading on the vessel 200.

In the embodiment of FIG. 2A, the plain cap that may be supplied with the vessel 200 is removed and the water 101 is added to the vessel 200. The cap 100 may then be placed on vessel 200. Together, the cap 100 and the vessel 200 may be referred to as the bottle.

The water 101 placed in the vessel 200 may come from a variety of sources. For example, the water 101 may come from a lake, a stream, a river, a puddle, a rainwater collection system, or other water source including what may ordinarily be considered contaminated water. As another example, the water 101 placed in the vessel 200 may come from a more refined source, such as a well, a municipal water supply, previously bottled water, etc. As described in one or more of the present embodiments, the type of water 101 may be a factor in a treatment routine executed by the user of the cap 100 and/or computer readable instructions of the cap 100. Additional explanation of the amount of the water 101 to be placed in the vessel 200, and optional calibration of the cap 100 thereto, is also provided in one or more other embodiments, below. Upon attachment of the cap 100, the bottle may be rotated and/or inverted until the ozone generator 102 is submerged in, and/or in contact with, the water 101, for example as illustrated in the embodiment of FIG. 2B.

FIG. 2B is an inverted bottle view 252 illustrating inversion of the bottle of FIG. 2A, the inversion causing agitation of the water 101 in the vessel 200, permitting visual confirmation of the operation of the ozone generator 102, and/or enhancing movement of the ozone gas 203 through the water 101, according to one or more embodiments. In the embodiment of FIG. 2B, the bottle is inverted 180 degrees and placed on a surface (e.g., the level surface 204) where, for a vessel 200 that is substantially rotationally symmetric, the bottle may be able to balance and/or rest upright and upside down on the resting base 212. The water 101 from an interior of the vessel 200 may then come in contact with the ozone generator 102 and also create the airgap 202 in the "bottom" of the vessel 200 (now pointing up following inversion of the bottle). The rotation and/or inversion may also impart motion to the water 101, cause agitation of the water 101, cause random motion of the water 101, cause turbulent motion of the water 101, and/or cause chaotic motion of the water 101.

Prior to and/or following the inversion, the ozone generator 102 of the cap 100 may be activated. The activation may draw power from the power source 104. Ozone 103 may then be generated and begin dispersing into the water 101 (which may be aqueous and/or the ozone gas 203 which may be in the form of bubbles). The ozone gas 203 may rise upward toward the bottom of the vessel 200 (e.g., which now faces upward due to the inversion). The ozone gas 203 moving upward may cause the ozone gas to pass substantially through the water 101 along the length of the vessel 200, which may increase contact time of the ozone 103 with contaminants and/or cause increased transition of the ozone 103 that is dissolved from the ozone gas 203. The motion imparted to the water 101 by the rotation and/or inversion may further result in swirling, mixing, and/or dispersion of the ozone gas 203 rising in the water 101, which may be observed to indicate that the ozone 103 is being produced and/or dispersed through the water 101.

Although FIG. 2B demonstrates full inversion of the bottle for clarity, it should be apparent to one skilled in the art that a partial rotation may be sufficient to have the water 101 contact the ozone generator 102 such that the distribution of the ozone 103 is promoted. For example, in one or more embodiments, the bottle may be rotated 90 degrees, or inverted just past a 90-degree angle. Additionally, one skilled in the art will recognize that the bottle may alternatively be held by the user in the inverted orientation and/or suspended in the inverted orientation. One or more embodiments described herein further permit the cap 100 to measure, detect, and/or act in response to a rotation angle and/or orientation.

FIG. 3A illustrates an electrolytic ozone generator, including an electrode 300 of the cap 100, the electrode 300 exposed to the water 101 inside the vessel 200, according to one or more embodiments. In the embodiment of FIG. 3A, the cap 100 has been fastened to the vessel 200 (only a portion of each of which are shown), forming a seal 313 which may be waterproof and/or water resistant to permit rotation of the bottle without substantial leakage out of the vessel 200 and/or into the cavity of the cap 100 (e.g., where electronics may be located such as the circuit board 1214 of FIG. 12). The embodiment of FIG. 3A shows an instance of the ozone generator 102 that is an electrolytic cell referred to herein as the electrode 300. The electrode 300 comprises an anode 302 and a cathode 304, and may further comprise a lead 303 for connection of a first electrical wire and a lead 305 for connection of a second electrical wire. The anode 302 may produce ozone 103 (including the ozone gas 203), and may additionally produce diatomic oxygen as a byproduct. The cathode 304 may produce hydrogen gas 314. A housing 308 may be used to mount the electrode 300, and a screen 106 may be optionally placed to protect the electrode 300, for example through mounting to the housing 308. The electrode 300 may be mounted to the housing 308 by use of one or more screws or other fasteners, including, as shown in FIG. 3A, utilizing a screw that may penetrate and/or otherwise extend across the seal plate 312 to attach the electrode 300 to the housing 308. The screw attached to the anode 302 may function as the lead 303, and the screw attached to the cathode 304 may function as the lead 305.

The electrode 300 may optionally include a proton exchange (PEM) membrane 307 (labeled and hereafter referred to as the PEM membrane 307). The PEM membrane 307 may enable the anode 302 and the cathode 304 to be electrically coupled even though the water 101 has a low electrolyte concentration, or even almost zero electrolyte concentration (e.g., as may be the case with deionized, distilled, or reverse osmosis water). For example, the PEM membrane 307 may be made out of "Nafion 117" proton exchange membrane. In one or more embodiments, the cathode 304 may be made from stainless steel and the anode 302 may be an electrode made from nickel oxide and/or tin oxide with optional antimony doping. In one or more other embodiments, the anode 302 may comprise boron doped diamond. When utilizing the PEM membrane 307, an additional fastener 306 (and/or one or more instances of the fastener 306) may be utilized to hold the anode 302 and the cathode 304 together to ensure an electrical coupling. The fastener 306 should be selected to be a non-conductive fastener, for example a plastic screw, to prevent a short circuit in the electrode 300.

The housing 308 may be made of metal, plastic, or another suitable material for contact with the water 101 and the ozone 103. An example of the housing 308 is illustrated in FIG. 12 as the housing 1208. Although not shown, a gasket and/or seal made of rubber or another polymer may be used to create or enhance the seal 313.

FIG. 3A is an electrolytic ozone generator view 350B that further illustrates a lighting element 316 set in the housing 308 to permit illumination of the water 101 and/or provide one or more indications to a user. For example, the lighting element 316 may be a light emitting diode (LED) that may be multi colored, where each color, intensity, frequency of flashing or pulsing, and/or programmed changes thereof can communicate various information to the user such as the status of the cap 100 (e.g., low battery, insufficient electrolyte concentration), an action to be taken (e.g., invert or shake the vessel), a completion signal, etc. The lighting element 316 may disperse light through a transparent and/or translucent shield 318 which may also form a watertight and/or water-resistant seal. Specific examples of the housing 308 and the seal plate 312 are illustrated in FIG. 12 as the housing 1208 and the seal plate 1212, according to one or more embodiments.

FIG. 3B is an electrolytic ozone generator view 350B that further illustrates an instance of the electrolytic ozone generator, including an instance of the electrode 300 without the PEM membrane 307, and further illustrates use of an agitator 320 comprising a motor 322 and a stirring member 324. The agitator 320 may be activated according to a routine to increase dispersion and/or mixing of the water 101. In one or more embodiments, the agitator 320 may be activated at all times in which the ozone generator 102 is active. In one or more embodiments, the agitator 320 may periodically turn on for short increments during a water treatment routine, for example alternating between production of the ozone 103 and agitation of the water 101.

FIG. 4 illustrates one or more features and augmentations usable along with the cap 100 of FIG. 1 and/or the vessel 200, according to one or more embodiments. In the embodiment of FIG. 4, an instance of the cap 100 is shown attached to a plastic water bottle (e.g., the vessel 200). A droplet-shaped instance of the indicator light 542 surrounds an activation switch 108, as further shown and described in conjunction with the embodiment of FIG. 11.

A fill mark 420 on the vessel 200 may be used to calibrate an amount of water 101 to be treated, for example as may be matched to a treatment routine. The fill mark 420 may also be used to increase the probability that the water 101 may have enough space to initiate chaotic motion (e.g., "slosh around") when the bottle is rotated and/or inverted. Further, the fill mark 420 may also be used, according to one or more embodiments, in the event a certain air gap 202 may be advantageous. For example, in one or more embodiments, creation of gasses with the electrode 300 (e.g., diatomic oxygen, ozone gas 203, the hydrogen gas 314) may cause pressure within the vessel 200. As an additional option, a vent 422 in the bottom of the vessel 200 may permit venting of gases in the airgap 202 when the vessel 200 is inverted, including any hydrogen gas 314. In some larger vessels 200, venting of hydrogen gas 314 may be important to reduce risk of explosion if the hydrogen gas 314 concentrates and, in the presence of an oxidizer, is exposed to electronics which may act as an ignition source. However, in one or more other embodiments, and for many normal applications of water treatment, any such pressure and/or hydrogen gas 314 buildup may be relatively small.

An input cap 400 may be used to pre-filter and/or screen water 101 being placed into the interior of the vessel 200 (e.g., such water being placed into the vessel 200 may be referred as an input water). For example, the input cap 400 may be fastened to the opening 201 of the vessel 200 and the vessel 200 then submerged in a water source such as a lake or stream. The input cap 400 comprises a filtration screen 402, which may be a filter for excluding debris and/or larger contaminants. For example, the filtration screen 402 may be a 40 micron or less screen. Alternatively, or in addition, a coarse screen (e.g., a 1 mm screen) can be used. A vent 401 may assist in relieving pressure from air that is displaced by the water 101 that might otherwise slow addition of the water 101 from a water source. The vent may include a tubing (shown but not labeled) such that the vessel 200 with the input cap 400 attached can be submerged under water, with the resulting pressure from water over the vessel 200 providing force to push the water 101 through the filtration screen 402 and into the vessel 200 (e.g., as an input water).

The output cap 410 comprises a catalytic decomposer 412 for decomposition of ozone 103. A user may wish the ozone 103 to be decomposed when the water is being output from the vessel 200 for a variety of reasons, for example to improve smell and/or taste, prevent oxidative damage to something the water 101 may come in contact with, decrease gaseous exposure which may irritate the lungs, and/or limit oxidative reactions with the human body if the water 101 is to be immediately consumed (e.g., which otherwise may irritate mucous membranes in some persons and/or affect microbial communities in the gut or elsewhere). In one or more embodiments, the catalytic decomposer 412 utilizes a decomposition catalyst that is platinum, which may be configured as a catalyst screen with relatively high surface area which gaseous and/or aqueous ozone may pass over. The catalytic decomposer 412 may be one or more catalyst screens, along with a small opening to impede the flow of the water 101 out of the vessel 200 (not shown in the embodiment of FIG. 4) and therefore increase contact time with the catalyst screens, according to one or more embodiments.

Although not shown, the output cap 410 may include a spout or other feature to assist in pouring the water 101 from the vessel 200. Additionally, each of the cap 100, the input cap 400, and the output cap 410 may include a lanyard or loop for attachment of a hook, carabiner, or other fastener that may permit attachment to one another, the vessel 200, a belt loop, a backpack, and/or another convenient location. In the embodiment of FIG. 4, a lanyard attachment point is illustrated (but unlabeled) on both the input cap 400 and the output cap 410.

Figure 5:
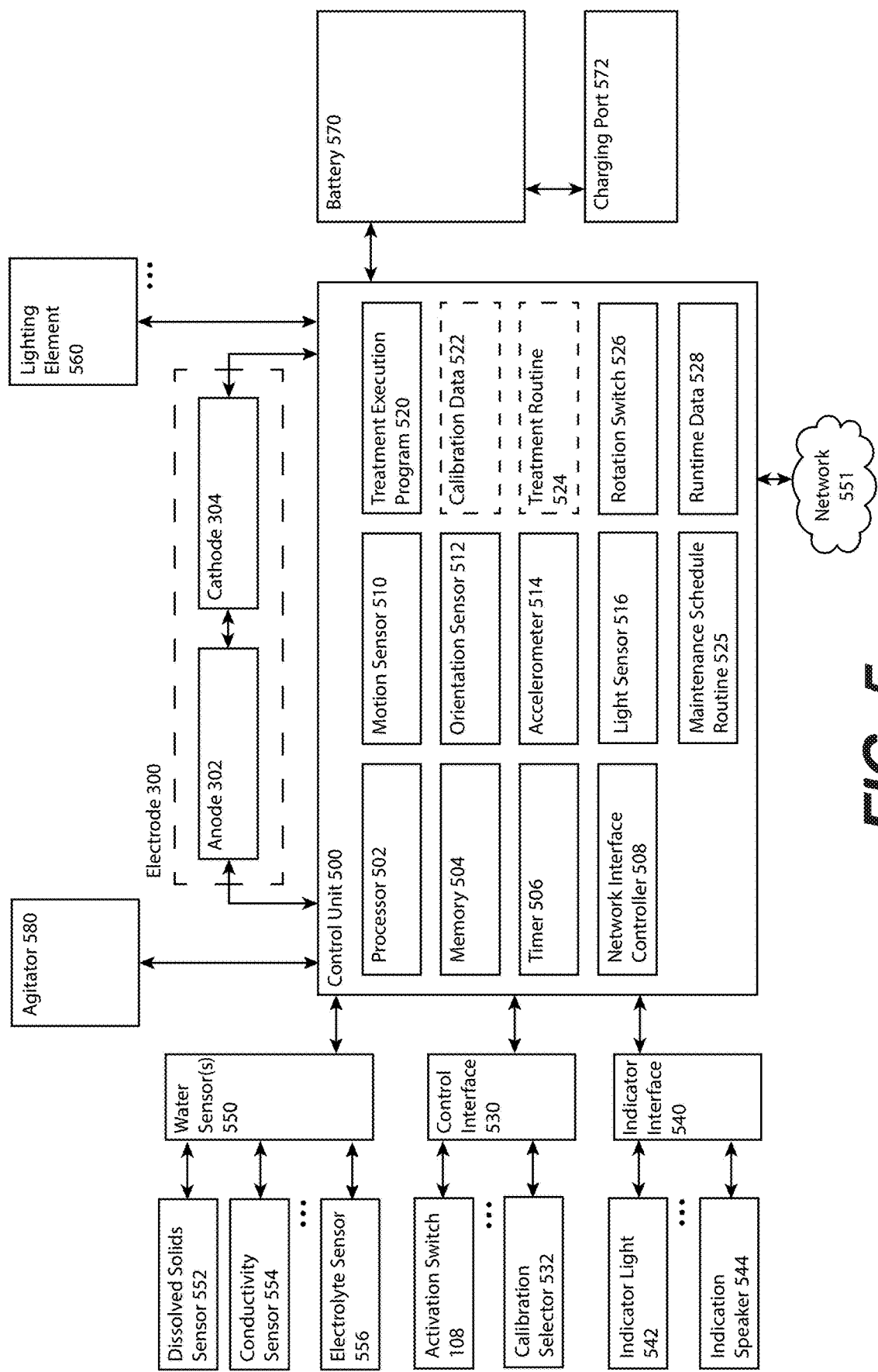
FIG. 5 illustrates a control unit of the cap of FIG. 1 communicatively coupled to an electrode, a control interface, an indicator interface, one or more water sensors, a lighting element, and/or a battery having a charging port, the control unit including a processor, a memory, one or more sensors, a timer, a treatment execution program, a treatment routine, and/or a calibration data (e.g., for a water type and/or a vessel size), according to one or more embodiments.

FIG. 5 illustrates a control unit 500 of the cap 100 communicatively coupled to a number of possible sensors, interfaces, and other elements, according to one or more embodiments. The control unit 500 includes a computer processor 502 (which may be simply referred to as the computer processor 502) and a computer memory 504 (which may be simply referred to as the computer memory 504). For example, the computer processor 502 may be a PIC microcontroller, a processor from a Raspberry Pi®, or an ARM processor. The computer memory 504 may be random access memory (RAM), solid state memory (e.g., SATA), read only memory (ROM), or other computer readable memories. The control unit 500 may include a timer 506 which may be a set of computer readable instructions that when executed measure a time period and/or expiration of a time period, and/or may be a timing circuit. The control unit 500 may include a network interface controller 508 permitting connection of the control unit 500 to the network 551, for example the internet, a wide area network (WAN), a local area network (LAN), a piconet (e.g., Bluetooth®), and/or other networks. The control unit 500 may also be connected to one or more computers through the network 551. For example, the control unit 500 may be connected through the network 551 to a device such as a smartphone, tablet, a desktop computer, a server computer, a wirelessly connected remote sensor, and other devices. The control unit 500 may receive data, receive updates or modifications to software and/or computer readable instructions, receive additional treatment routines, transmit diagnostic data, and send and receive other data related to the operation of the cap 100.

The control unit 500 may also include one or more sensors for sensing motion of the cap 100, which may indicate presence of the user, agitation of the water 101, and other information related to treatment effectiveness. A motion sensor 510 may be used to sense motion of the cap 100, which may infer agitation of the water 101 in the vessel 200. For example, a treatment routine may require that the user interact with the bottle every three minutes over a fifteen-minute period to ensure sufficient agitation for dispersion of the ozone 103. An orientation sensor 512 may sense an orientation of the cap 100 (and therefore the vessel 200 attached to the cap 100). For example, a treatment routine may require that a treatment for one liter of water is 3 minutes if the cap 100 is completely inverted and agitated once per minute during that time, but ten minutes if the cap 100 is only rotated ninety degrees (e.g., a bottle may have fallen over, or may have been stored on its side). Similarly, data from an accelerometer 514 may be used to infer water agitation, and whether it is sufficient within the treatment routine, to increase the probability of safe and/or effective ozone treatment. The accelerometer 514 may also be able to detect certain motions that yield highly efficient agitation of the water (e.g., swirling, rapid shaking) and therefore require less ozone 103 generation and therefore less use of the power source 104 such as the battery 570. A light sensor 516 may generate data measuring a current light level and/or brightness of an area outside the vessel 200, which may be used, for example, to determine whether to activate the lighting element 560 and/or how bright to make an indicator light 542.

A treatment execution program 520 comprises computer readable instructions that when executed carries out a treatment routine 524. In one or more embodiments, the treatment execution program 520 may, for example, receive user input (such as a selection of the treatment routine 524 and/or a selection of the calibration data 522, discussed below) and initiate one or more steps of the treatment routine 524. The treatment execution program 520 may specify one or more treatment actions to be indicated to, and carried out by, the user (e.g., inversion, rotating, shaking, etc.), one or more automated actions (e.g., activation of the ozone generator 102 upon a condition, periodic activation of the agitator 320), one or more waiting periods during which ozone 103 is generated and/or allowed to remain in contact with the water 101, and/or one or more indications of the failure or success of treatment of the water 101, etc.

The calibration data 522 may include a set of data that the user may input and/or may select which may be a factor in safe and/or effective water treatment. For example, the cap 100 may be capable of fastening to many sizes of bottle and may be intended to treat many types or volumes of water 101. The user may be required to enter a water type, such as 'clear', 'clear but discolored', and/or 'dirty'. In another example, the water type may be 'pre-treated', 'nature', or 'known contaminants'. In another example, an intended use may be selected, such as 'drinking', 'washing', sterilization', or 'antiseptic'. In yet another example, a size of the vessel 200 may be selected such as '500 mL', 1 liter, 1 quart, 1 gallon, 5 gallons, 7 gallons. In one or more embodiments, the calibration data 522 may include a table of known treatment times and ozone concentrations, and/or may include one or more functions for calculating parameters that may be required by the treatment execution program 520.

The treatment routine 524 comprises data specifying a treatment routine to be executed by the treatment execution program 520. For example, the treatment routine 524 for 'dirty' water may specify that for each 250 mL of the water 101, ozone generation should be 2 minutes, while indicating that the user agitate the water 101 every 2 minutes (and increase the increment to 4 minutes if no agitation is sensed).

The runtime data 528 comprises data related to and/or derived from operation of the control unit 500 and/or the ozone generator 102. For example, the runtime data 528 may include total minutes or hours of operation, sessions of operation, detected hardware and/or software failures, and other data. The maintenance schedule program 525 comprises computer readable instructions that detect a maintenance limit (e.g., a number of hours operated, a number of battery cycles, an operation time in a water 101 with high dissolved solids concentration, etc.). The maintenance schedule program 525 may then indicate a need for maintenance and/or an impending need for maintenance to the user. The maintenance schedule program 525 may also perform additional actions, such as for example disabling the activation of the ozone generator 102 upon a dire need for maintenance or very low battery.

The control unit 500 may be coupled to one or more elements of a control interface 530. The control interface 530 may be a physical control interface comprising one or more buttons, switches, dials, touchpads, and/or other means of interaction. The control interface 530 may include an activation switch 108 that activates the ozone generator 102 (and/or begins the treatment execution program 520). The control interface 530 may also include a calibration selector 532 that may receive a calibration input from the user. As just one example, the control interface 530 may be a single multi-function button, where pressing quickly changes a calibrated water type from 'clean' to 'moderate' to 'dirty', and once selected, holding the button functions as the activation switch 108. Additional possible interfaces include UI of a mobile device connected through the network 551, and/or through use of a voice control interface and/or control by an 'AI' personal assistant.

The control unit 500 may be communicatively coupled with one or more elements of an indicator interface 540. The indicator interface 540, for example, may include an indicator light 542 which may be varied in whether it is on or off, varied in color (e.g., a single LED cell capable of multiple colors and/or multiple LEDs of different colors), and/or whether the indicator light 542 is a certain brightness or displays a certain visual pattern (e.g., blinking, fading in-and-out, etc.). The indicator interface 540 may also include a speaker 544 which may provide instructions to the user and/or sound or verbal indications (e.g., "please gently shake the water," or "the water is not ready yet" when the user tries to unscrew the cap 100, the motion of which may be determined from data generated by the accelerometer 514).

The control unit 500 may further be communicatively coupled to one or more water sensors 550, for example a dissolved solids sensor 552, a conductivity sensor 554, and/or an electrolyte sensor 556 to sense an electrolyte concentration. Each of the water sensors 550 may be housed in the interior surface 114 of the cap 100. Conductivity and/or total dissolved solids may be measured through measuring resistance between two leads. For example, the conductivity may be an expression of the ability of a solution to conduct electric current. Conductivity may be expressed as a microsiemen (micro-Siemens per centimeter or μS/cm) or in higher conductivity levels as a millisiemen, and may be the reciprocal of resistivity.

The control unit 500 may be further coupled with an agitator 580, which may be a mechanical agitator, for example, as shown and described in conjunction with the embodiment of FIG. 3B. The agitator 580 includes an apparatus for agitating the water 101, for example rapid vibration of a paddle (e.g., the stirring member 324), or utilizing an electric motor to turn a propeller. As described, the agitator 580 may be automatically driven by the treatment execution program 520.

The control unit 500 may be communicatively coupled to a lighting element 560, for example an LED. The lighting element 560 may be used to illuminate the water 101 such that a user can determine whether the ozone generator 102 is generating ozone 103 (e.g., by viewing the ozone gas 203). The lighting element 560 may also be used as an indicator light 542 as part of the indicator interface 540, and/or for auxiliary purposes such as utilizing the bottle comprised of the vessel 200 and the cap 100 into a flashlight and/or camping lantern irrespective of water treatment.

The control unit 500 draws power from the battery 570 (an instance of the power source 104 of FIG. 1). For example, the battery 570 may be a 3 volt, 1800 mA lithium ion battery. The battery 570 may be reusable and/or rechargeable, for example through the charging port 572 (an example of which is illustrated in FIG. 13). The control unit 500 and/or the cap 100 may also be able to run from power supplied directly through the charging port 572 and/or another power port (not shown).

Figure 6:
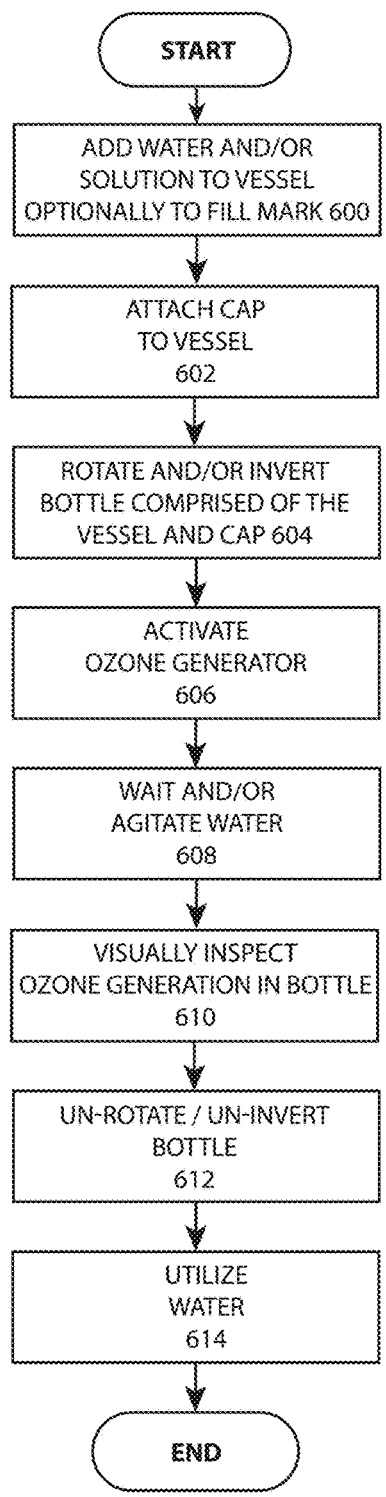
FIG. 6 illustrates a water treatment process flow for treating water in a vessel using the cap of FIG. 1, according to one or more embodiments.

FIG. 6 illustrates a water treatment process flow 650 for treating water in a vessel using the cap of FIG. 1, according to one or more embodiments. In operation 600, water and/or a solution is added to a vessel 200, optionally to a fill mark 420. The input of water 101 may be placed directly into the vessel 200 through the opening 201 through a manual process (e.g., a user holding the vessel 200 under the surface of a lake) or an automated process (e.g., a pump activating to pump water into the vessel 200 through a piping). A pre-treatment may be utilized, for example filtering and/or screening the water 101 through the input cap 400 of FIG. 4. In operation 602, the cap 100 is attached to the vessel 200. For example, the cap 100 may be attached to the opening 201 of the vessel 200 with the fastener 110 (e.g., a threading 210A of the cap 100 and a threading 210B of the vessel 200). The cap 100 and the vessel 200 are collectively referred to herein as a bottle.

In operation 604, the bottle is rotated and/or inverted. In one or more embodiments, the rotation occurs at a rotation angle at least sufficient to saturate the ozone generator 102 with the water 101. In one or more embodiments, the rotation may be an inversion having a rotation angle greater than ninety degrees which may be measured based on a deflection from a vertical axis running through an opening 201 of the vessel 200. In one or more other embodiments, the rotation may be a complete 180 degree inversion such that the cap 100 now faces downward. The bottle may be held, fixed, or tested in the rotated and/or inverted position. For example, a hanger, a suction cup, a base, a stand, and/or other systems, devices, and methods may be used to hold the bottle and/or fix the orientation of the bottle.

In operation 606, the ozone generator 102 is activated. The activation may occur manually (e.g., a user pressing the activation switch 108) and/or may occur automatically (e.g., activation in response to the control unit 500 determining a threshold rotation angle has occurred and/or the water 101 is in contact with the interior surface 114 of the cap 100). In operation 608, a waiting period is permitted to pass, optionally with one or more agitations of the bottle and/or the water 101. The waiting period may depend on the type of water (e.g., total dissolved solids, conductivity, clarity, user-specified types, source, and/or other sensed contaminants), may depend on the size of the vessel 200 and/or the volume of water 101 in the vessel 200 (e.g., 250 mL, 1 liter, 1 gallon, 5 gallons, 7 gallons), and other factors. The amount of agitation may similarly depend on the type of water and/or the volume of the water 101. The waiting period and/or the agitation requirements may be pre-calibrated (e.g., in the calibration data 522 of FIG. 5) but may also depend on the water type and/or the volume of the water 101 to be treated. The waiting period may be timed (e.g., by the timer 506) and/or any need for agitation may be indicated to the user (e.g., by one or more indicators of the indicator interface 540 such as an indicator light 542) and/or automatically initiated (e.g., by the agitator 320).

In operation 610, the ozone 103 generated by the ozone generator 102 may be visually inspected in the bottle, for example through a transparent portion of the vessel 200. Alternatively or in addition, the ozone 103 may be detected through an automated optical sensor, for example a laser emitted and received above the ozone generator 102 that may obstructed by the rising ozone gas 203. Following operation 608 and/or 610, the ozone generator 102 may be manually or automatically deactivated. In operation 612, the bottle is un-rotated and/or un-inverted, for example such that the ozone generator 102 is no longer in contact with the water 101 and/or such that the cap 100 can be removed without the water 101 spilling out of the vessel 200. In operation 614, the water 101 may be utilized, for example for drinking, cleaning, disinfection, as an oxidizing agent, and/or for other uses of ozonated water. The water 101 may also be output from the vessel 200 through the output cap 410, for example to reduce and/or eliminate latent ozone 103 through contact with the catalytic decomposer 412. Following operation 612, the water 101 may also continue to "sit" and/or "rest" to increase contact time of the ozone 103.

Figure 7:
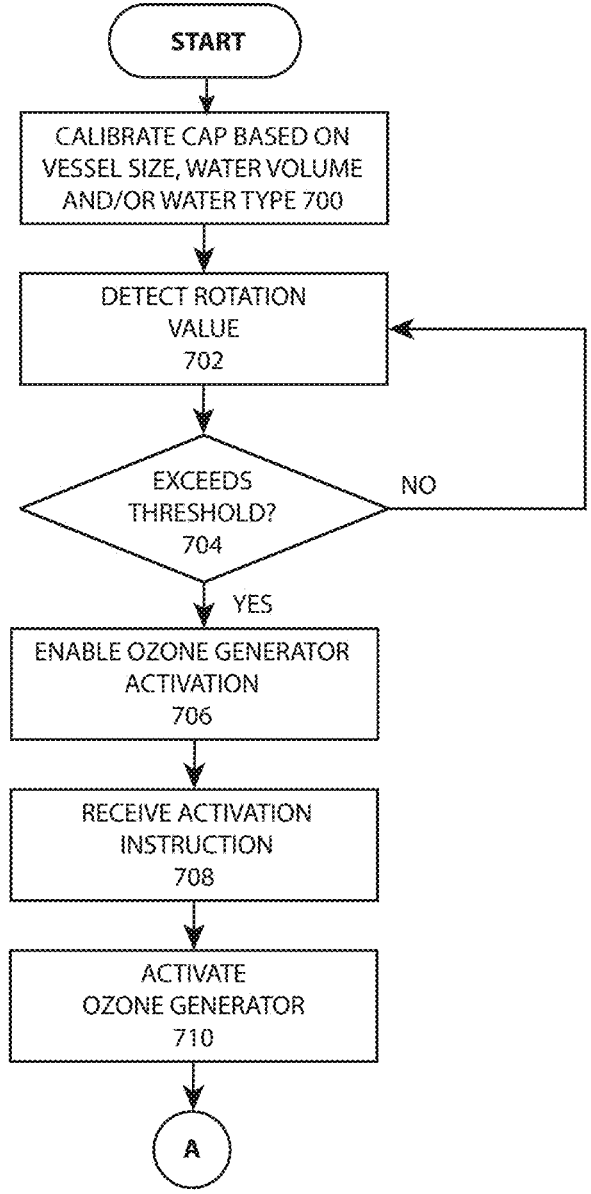
FIG. 7 illustrates an activation process flow for enabling activation of the ozone generator based on one or more sensed values indicative of effective and/or safe operation, according to one or more embodiments.

FIG. 7 illustrates an activation process flow 750 for enabling activation of the ozone generator 102 based on one or more sensed values indicative of effective and/or safe operation, according to one or more embodiments. Operation 700 calibrates the cap 100 based on a vessel 200 size, a water 101 volume, a water 101 type, and/or other criteria. In one or more embodiments, a user may provide a calibration input through the control interface 530 (e.g., through a calibration selector 532). For example, the cap 100 may include a first switch where the user can select a water type (e.g., 'pre-treated', 'clear', and 'dirty') and a second switch where a user can choose between one of several treatment volumes (e.g., 500 mL, 1 liter, 2 liters, 3 liters). In one or more embodiments, a calibration input may be automatically determined and/or sensed. For example, an optical sensor of the cap 100 may be able to determine a size of the vessel 200 based on a bar code or other visual indicator of the vessel 200 that is automatically read when the cap 100 is attached to the vessel 200.

Operation 702 detects a rotation value of the cap 100. The rotation value may be sensed by one or more sensors, such as the motion sensor 510, the orientation sensor 512, and/or the accelerometer 514. The rotation value may be stored as data in a memory register (e.g., of the computer memory 504) and/or may be a signal sent to a circuit. Operation 704 determines whether a threshold rotation angle has been exceeded. For example, the threshold rotation angle may be 30 degrees, 45 degrees, 90 degrees, 120 degrees, or 180 degrees. Operation 704 may be effected by computer readable instructions that when executed on the computer processor 502 compares the rotation value to a value of the threshold rotation angle to determine whether the rotation value exceeds the value of the threshold rotation angle. Alternatively, or in addition, the rotation value of operation 702, when exceeded, may send a signal to a circuit that effects operation 704 when the signal is received. If the threshold rotation angle is not exceeded, operation 704 returns to operation 702. If the threshold rotation angle is exceeded, operation 704 continues to operation 706.

Operation 706 enables activation of the ozone generator 102. For example, prior to exceeding the threshold rotation angle, the user and/or an automated process may not be able to activate the ozone generator 102 (e.g., it may be disabled). In one or more embodiments, such restriction may assist in conserving battery life, ensuring the treatment process is effective where ozone to be delivered to the water 101 is based on a timer, preventing burning out or strenuous use of an electrode 300, reducing ozone gas 203 that will not be dissolved but which could escape the vessel 200 to become a biological irritant or an unwanted oxidizing agent, and/or other reasons. Operation 706 may be effected by the rotation switch 526 of FIG. 5.

Operation 708 receives an activation instruction. The activation instruction may be manually provided (e.g., by a user pressing the activation switch 108) and/or may be automatically provided, for example also upon the bottle exceeding the threshold rotation angle and/or a different threshold rotation angle. Operation 710 then activates the ozone generator 102. Operation 710 may end or may proceed to the process flows of FIG. 8 or FIG. 9, as shown connected through reference point 'circle A'. Although not shown in the present embodiment, in one or more embodiments an additional and/or alternative operation may sense whether the water 101 is in contact with the interior surface 114 and/or the ozone generator 102. For example, an operation 705 (not shown) may determine water 101 is in contact with the interior surface 114 of the cap 100 (e.g., through a resistance and/or conductivity sensor). If no water 101 is determined to be in contact, the operation 705 may return to operation 700 or operation 702. If water 101 is detected, operation 705 may proceed to operation 706.

Figure 8:
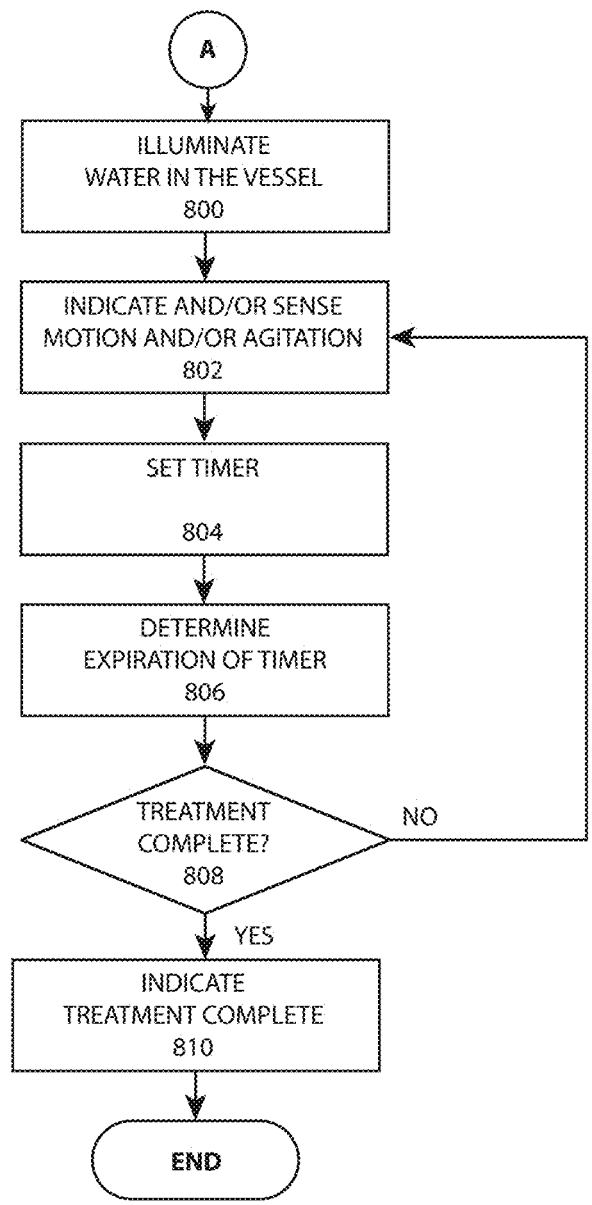
FIG. 8 illustrates a treatment process flow indicating a treatment process for water in the vessel, including periodic indications for rotation, motion, and/or inversion before, during, and/or after ozone generation, according to one or more embodiments.

FIG. 8 is a treatment process flow 850 illustrating a treatment process for water 101 in the vessel 200, including periodic indications for rotation, motion, and/or inversion before, during, and/or after ozone 103 generation, according to one or more embodiments. The treatment process flow 850 may be an example of a treatment routine 524. Operation 800 illuminates the water 101 in the vessel 200. For example, the lighting element 316 in the interior surface 114 may be utilized to illuminate the water 101, as shown and described in conjunction with the embodiment of FIG. 3. In one or more embodiments, the illumination may assist in the user and/or an automated process in detecting and/or confirming generation of the ozone gas 203 and/or the operation of the ozone generator 102 (e.g., as effected in operation 610). In one or more embodiments, the illumination may also be used as an indicator (e.g., as an indicator light 542 of FIG. 5). As an example, the lighting element 316 providing the illumination may "breathe" (slowly cycle between high and low intensity) to communicate that water treatment is in process. It should be noted that the illumination may be configured to provide light as a light source for working, camping, and other purposes as a flashlight, lantern, or nightlight, and therefore may be separately activatable.

Operation 802 through operation 806 may occur in one or more "cycles." For example, the cap 100 may have been calibrated to treat a specific type of water and/or volume of water by running three, two-minute cycles, indicating to the user to gently agitate the bottle after each cycle (e.g., in operation 802). Operation 802 indicates that motion of the bottle and/or agitation of the water 101 is required and/or senses that the bottle is moving and/or agitation of the water 101 has occurred (or is inferred to have occurred through motion). For example, it may be indicated to a user that the bottle should be shaken or inverted. Upon detecting motion, operation 802 may then proceed to operation 804. Operation 804 may set a time (e.g., the timer 506), for example to begin a waiting period. Operationally, if no motion is sensed in operation 802, the timer may be set for a longer period within that cycle. Operation 806 may then determine expiration of the timer and proceed to operation 808. Operation 808 may determine whether the treatment is complete based on a number of completed cycles in which operation 802 through operation 806 iterated. If the number of required cycles has not yet been achieved, operation 808 may return to operation 802. If the number of cycles has been met or exceeded, operation 808 may proceed to operation 810.

The number of cycles may be measured through additional processes not shown. For example, an operation 801 may set a value 'x' for the number of cycles to be completed. The setting of the value 'x' may be determined from the calibration data 522. An operation 807 may increment a value 'i', where the value 'i' starts at an index of zero and indicates the number of completed cycles of operation 802 through operation 806. In such case, the decision in operation 808 may compare 'i' to 'x', where 'i' being equal to or greater than 'x' results in advancement to operation 810. Operation 810 may then indicate to the user that the treatment is complete, and/or may optionally turn off the ozone generator 102. Although not shown, the treatment routine may also "time out" in the event no motion is sensed in operation 802.

Figure 9:
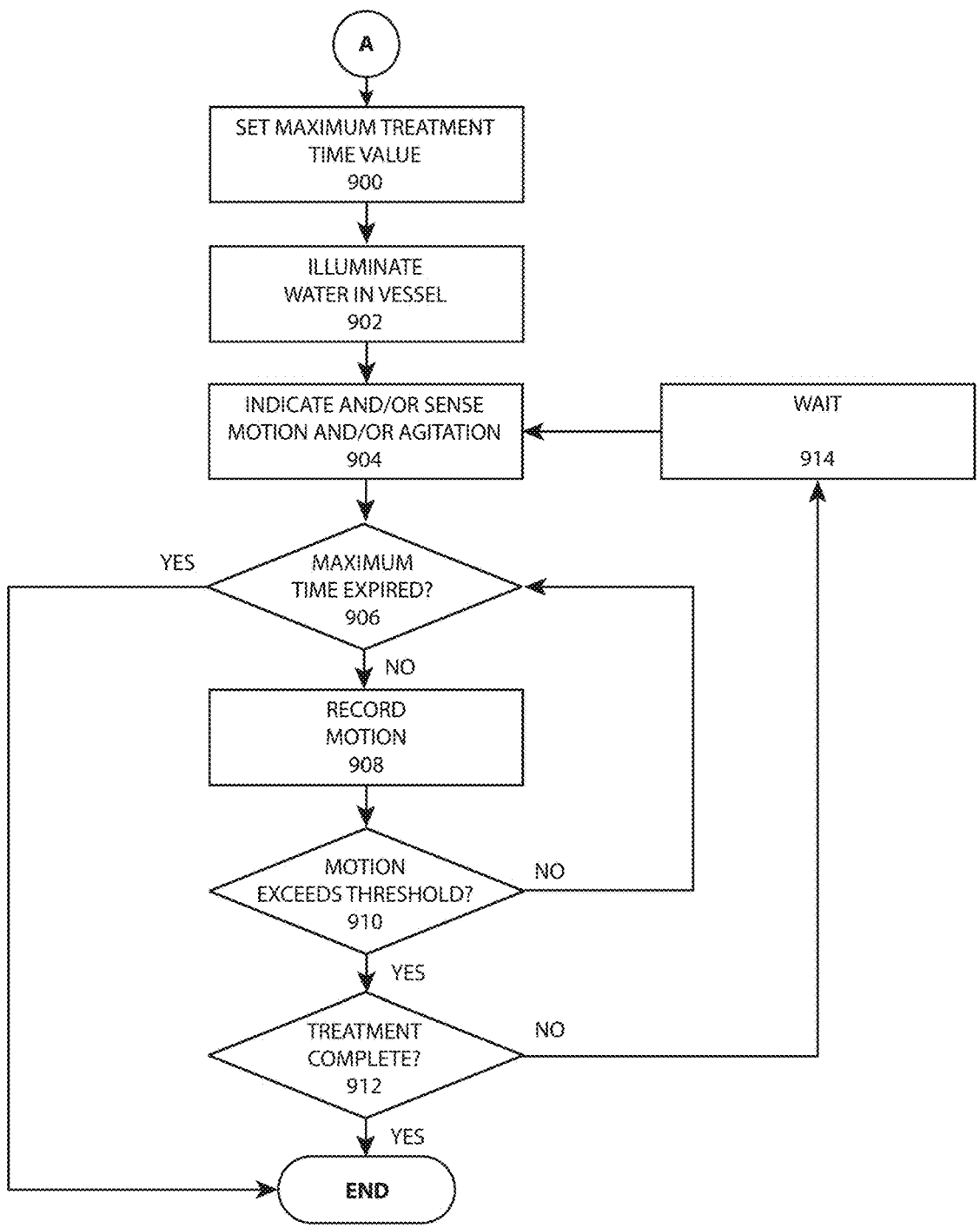
FIG. 9 illustrates another treatment process flow for increasing the probability of effective water treatment through sensing one or more indicators of water agitation while executing a treatment process, according to one or more embodiments.

FIG. 9 illustrates another treatment process flow 950 for increasing the probability of effective water treatment through sensing one or more indicators of water 101 agitation while executing a treatment routine, according to one or more embodiments. The treatment process flow 950 may be an example of a treatment routine 524. Operation 900 sets a maximum treatment time value (e.g., 2 minutes, 5 minutes, 10 minutes). The maximum treatment time value, for example, may be used as a "timeout" value and/or may be a reference time which may be decreased depending on an amount of sensed motion of the cap 100 and/or inferred agitation of the water 101. Operation 902 illuminates the water 101 in the vessel 200, for example similarly to operation 800 of FIG. 8. Operation 904 indicates to a user that motion and/or agitation should occur, and/or senses motion and/or agitation. Operation 904 may execute similarly to operation 802 of FIG. 8. Operation 906 determines whether the maximum time value has been exceeded. If the maximum time has been exceeded, the treatment process flow 950 may end. If the maximum time has not been exceeded, operation 906 may advance to operation 908. It should be noted that operation 906 may optionally be a concurrent process that is always running and will, upon determination that the maximum time value is exceeded: (i) terminate the treatment, (ii) indicate that the treatment is complete, and/or (iii) automatically turn off the ozone generator 102.

Operation 908 records a motion of the cap 100. For example, the motion may be sensed through one or more sensors generating data which is stored in a memory register (e.g., of the computer memory 504). The sensors include, for example, the motion sensor 510, the orientation sensor 512, and/or the accelerometer 514. Alternatively or in addition, agitation of the water 101 may be detected, for example by a probe or other agitation measuring device inside the vessel and/or protruding from the interior surface 114 of the cap 100. Operation 910 determines whether the motion (and/or the agitation) exceeds a threshold motion value (and/or a threshold agitation level). The agitation level may be an amount of internal movement of the water 101, as may be indicated in a laboratory test by the rate at which a test particle circulates and/or a marker (such as a dye) mixes with the water 101. A low agitation level may cause little movement of the test particle and slow dispersion of the marker, whereas a high agitation level may cause greater movement of the test particle and faster dispersion of the marker. For example, to infer an agitation level, a certain total amount of movement may be required, a certain amount of changes in velocity and/or acceleration may be required, and/or a number of consecutive differing orientations may be required (e.g., right-side up, then upside down, then right-side up again).

Where the threshold motion value is not exceeded, operation 910 returns to operation 906, and additional motion may again be recorded and compared in operation 908 and operation 910. Where operation 910 determines that the threshold motion value is exceeded, operation 910 may advance to operation 912. Operation 912 may determine whether a treatment is complete, for example based on a number of cycles of operation 904 through operation 910. A similar counting system may also be utilized, as explained in conjunction with operation 801 and operation 807 of FIG. 8. If the treatment is complete, operation 912 may proceed to end the treatment process flow 950. If the treatment is not complete, operation 912 may proceed to operation 914 which may wait a predetermined amount of time. Operationally, an operation 913 (not shown) may decrease the maximum time value depending on detecting any motion and/or depending on the amount of motion in operation 908. In such case, operation 913 may reduce power usage (and may therefore increase battery life and treatable water volume per battery charge) and use of the ozone generator 102 where a user and/or another process is actively employed to agitate the water 101 in the vessel 200. Operation 914 may return to operation 904 to begin an additional 'cycle' in the water treatment routine.

Figure 10:
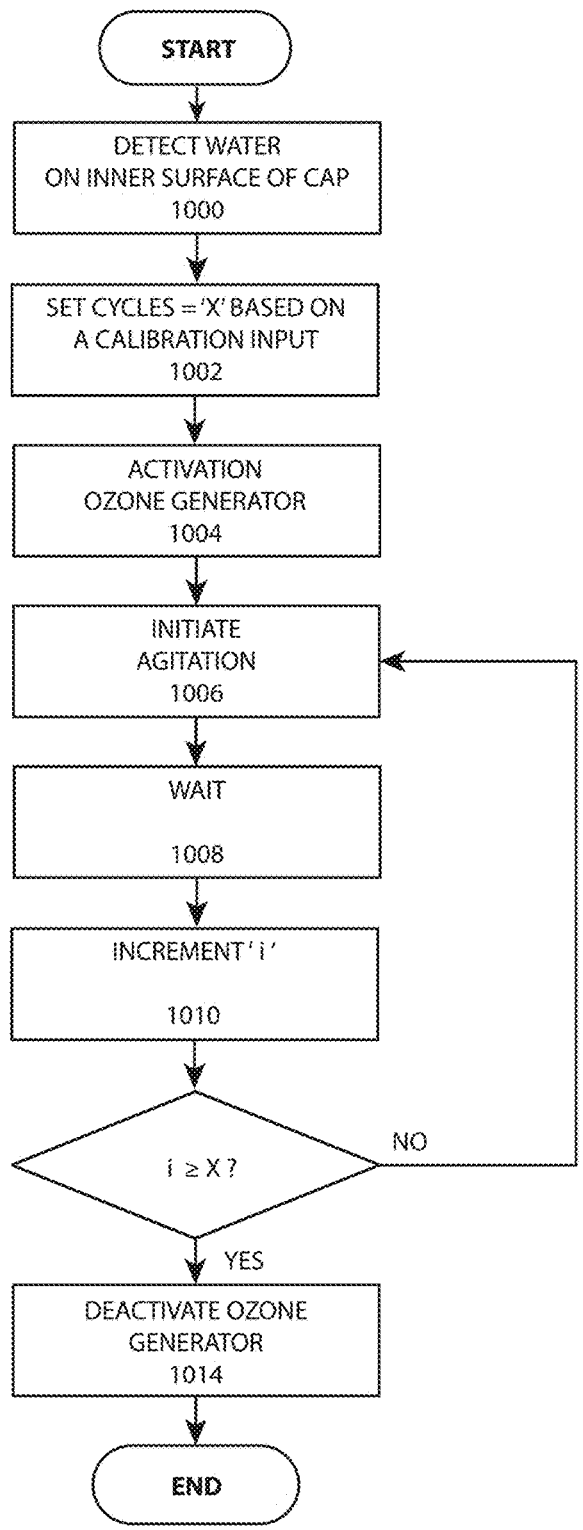
FIG. 10 is another treatment process flow further illustrating use of an agitator to agitate the water of the vessel, according to one or more embodiments.

FIG. 10 is another treatment process flow 1050 further illustrating use of an agitator (e.g., the agitator 320 of FIG. 3B) to agitate the water 101 of the vessel 200, according to one or more embodiments. Operation 1000 detects the water 101 on the interior surface 114 of the cap 100, for example as may indicate that the bottle has been rotated and/or inverted. For example the water 101 may be detected through an optical sensor, the conductivity sensor 554, and/or other sensors. Operation 1002 sets a number of cycles equal to 'x' based on a calibration input, for example a calibration input entered by the user on the calibration selector 532 and/or automatically selected. Operation 1002 may also set a count index 'i' to zero. Operation 1004 initiates the ozone generator 102 by supplying a current to the ozone generator 102 from the power source 104. Operation 1006 initiates an agitator (e.g., the agitator 580). For example, the agitator may be a component of the cap 100 and/or a component of the vessel 200. In one or more embodiments, the agitator 580 may be based on rotating a paddle, propeller, or other shape suitable to stir or otherwise cause agitation of the water 101 with an electric motor powered by the power source 104. In one or more embodiments, the agitator 580 may be based on rapid vibrating motion. Other devices and methods may also be used to agitate the water.

Operation 1008 waits for a period of time, for example 5 seconds, 30 seconds, 1 minute, or 5 minutes. The waiting period may be based on the calibration input. Operation 1010 increments 'i'. Operation 1012 compares 'x' to 'i'. Where i<x, operation 1012 returns to operation 1006. Where i≥x, operation 1012 advances to operation 1014. Operation 1014 then deactivates the ozone generator 102 to complete treatment of the water 101. The treatment process flow 1050 may therefore, for example, be utilized to specify x cycles in which the water 101 in the vessel 200 is agitated and permitted a resting period while the ozone 103 is generated. Similarly, a modified process flow may be used to intermittently generate ozone 103, agitate the water 101 (while the ozone generator 102 pauses operation), wait for a waiting period (while the ozone generator 102 remains paused), and then again activate the ozone generator 102. Such intermittent use of the ozone generator 102 and the agitator 580 may also conserve battery life, according to one or more embodiments.

In one or more embodiments, the time and/or pattern in which the ozone generator 102 is operated and the agitation of the water 101 occurs (whether by the user or the agitator 580) may be based on a function. The function may have inputs that include a water type, a water volume, a vessel size, a usage type (e.g., drinking water, wound treatment, etc). The function may have an output that may include a treatment time, a required agitation value, and/or selection of a treatment routine. In one or more embodiments, the function may also have an initial treatment time that may be reduced according to the amount of agitation sensed and/or inferred such that active agitation may reduce battery usage. In other words, in one or more embodiments the cap 100 may determine agitation and/or motion is not present before or during a treatment routine and therefore generates additional ozone 103 to increase the probability of effective treatment.

In one or more embodiments, additional methods may be utilized to treat the water 101 with the ozone 103. In one embodiment, a vessel 200 containing water 101 may be attached to a cap 100 comprising an electrode 300 coupled to a power source 104 (e.g., such as a battery 570) capable of generating an ozone 103 when the electrode 300 is exposed to the water 101 and a current is applied to the electrode 300. The vessel 200 may be rotated until the water 101 contacts an anode 302 of the electrode 300. The electrode 300 may be activated by applying the current from the power source 104 to generate ozone gas 203 that rises (e.g., as bubbles, as reduced density aqueous solution) while the vessel 200 remains rotated (e.g., rotated 90 degrees, rotated 180 degrees). The electrode 300 may comprise nickel-tin oxide and/or boron-doped diamond.

The method may also filter an input water 101 transferring into the vessel (e.g., with an input cap 400 and/or a different filter), and/or catalytically decompose at least a portion of the ozone 103 in water 101 transferring out of the vessel 200 (e.g., with the output cap 410). The method may also vent hydrogen gas 314 from the vessel 200. The catalytic decomposition may include passing the water 101 through a mesh that includes platinum and/or palladium.

In one or more embodiments, the method may also utilize computer readable instructions to perform one or more automated and/or controlled functions. The method may initiate, through execution of computer readable instructions on a computer processor 502, a timer 506 upon activation of the electrode 300. Upon expiration of the timer 506, the method may automatically deactivate the electrode 300 through execution of computer readable instructions on a computer processor, for example if the timer 506, when expiring, stops the current to the ozone generator 102 (e.g., the electrode 300). The timer 506 can be calibrated to the water type, the water volume, and/or the vessel size.

The method may illuminate the water 101 in the vessel 200 through execution of computer readable instructions on a computer processor 502 in response to generation of the ozone gas 203 rising in the vessel 200 when the vessel 200 is rotated. The illumination of the water 101 may include light from a lighting element 560 set in the interior surface 114 of the cap 100. It may also be determined through execution of computer readable instructions on a computer processor 502 that a motion value of the cap 100 stored in a computer memory 504 has exceeded a threshold motion value. The motion value may be sensed with an accelerometer 514.

The method may activate, through execution of computer readable instructions on a computer processor 502, a first indicator (e.g., an indicator light 542, a sound from a speaker 544) to indicate the water 101 of the vessel 200 has achieved an agitation level inferred from the motion value. It may be determined through execution of computer readable instructions on a computer processor 502 that a rotation angle of the cap 100 stored in the computer memory 504 has exceeded a threshold rotation value (e.g., 30 degrees, 60 degrees). The method may also enable activation of the electrode 300 when the rotation angle of the cap 100 stored in the computer memory 504 has exceeded the threshold rotation value.

The method may receive, through execution of computer readable instructions on a computer processor 502, a calibration input that is a water type, a water volume, and/or a vessel size. The method may activate the first indicator and a second indicator to visually indicate expiration of the timer 506, activation of the electrode 300, and/or an operational status of the electrode 300 (e.g., low battery, need for servicing, currently generating ozone, etc.).

Figure 11:
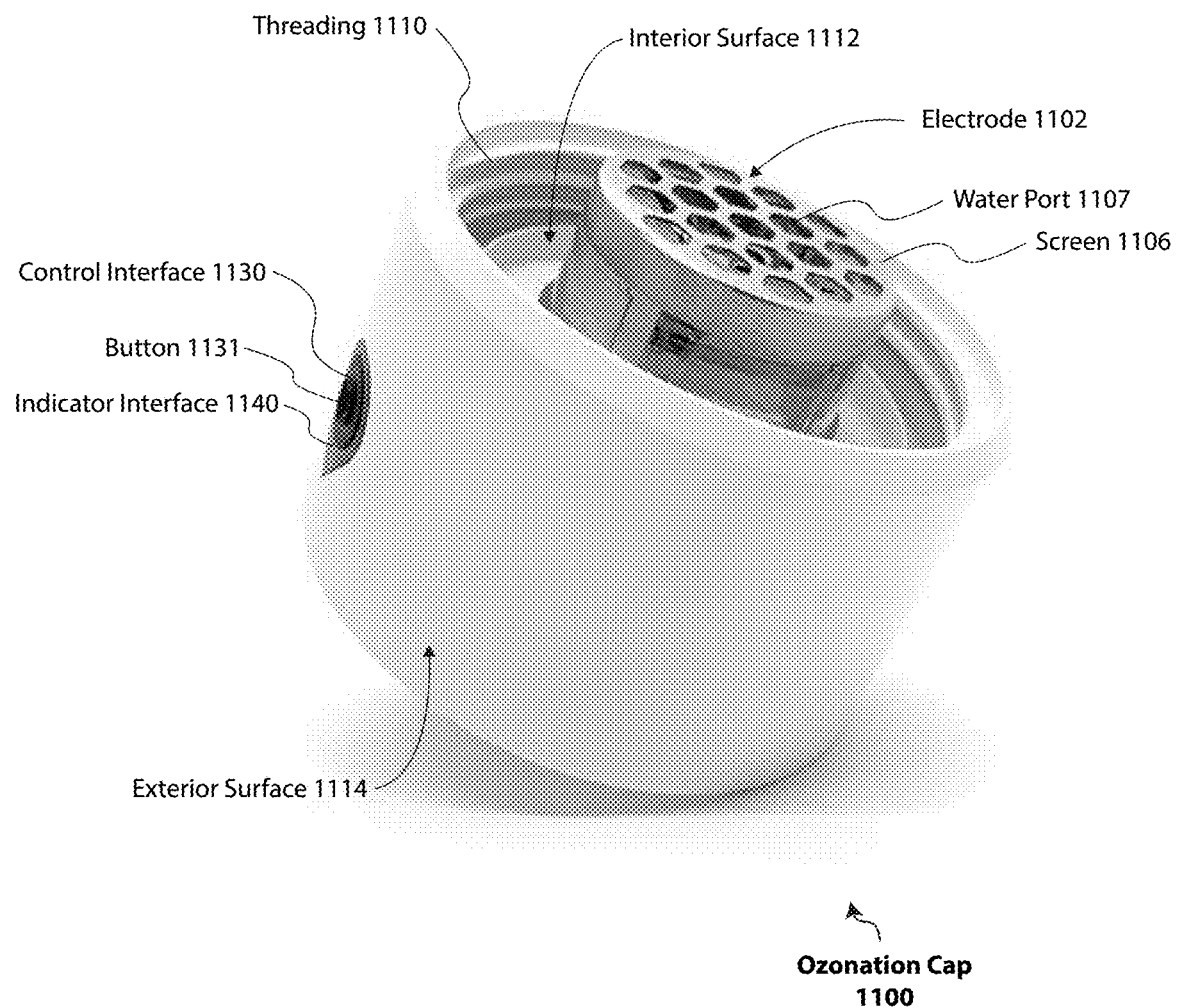
FIG. 11 illustrates an instantiation of the cap of FIG. 1, the cap screwing onto a standard size water bottle (e.g., the vessel) and generating ozone using an electrode powered with an internal battery, the cap including a control interface having a single button, a first indicator light, a lighting element providing light through the interior surface to illuminate the water and usable as a second indicator light, according to one or more embodiments.

An example embodiment will now be described in FIG. 11 through FIG. 13. FIG. 11 illustrates an instantiation of the cap 100 of FIG. 1 (referred to herein as the cap 1100). The cap 1100 screws onto a standard size water bottle (e.g., the vessel 200) with threading 1110 (e.g., an instance of the threading 210) and generates ozone 103 using an electrode 300 powered from an internal battery (e.g., the battery 570). In one or more embodiments, the cap 1100 comprises an electrode 1102 that may comprise an anode 302 made from boron-doped diamond. In one or more embodiments, an anode 302 made from antimony-doped tin-nickel oxide dip-coated on a titanium substrate according to the method of Wang, et al (J. Electrochem. Soc., Volume 152(11), pp D197-D200 (2005)). The screen 1106 may be made from stainless steel, including a plurality of water ports 1107 permitting the water 101 to reach the anode 302 of the electrode 300. The threading 1110 may be a standard threading that may fit many Nalgene® water bottles (e.g., which may be 2 and 7/16 inch diameter with 6 threads per inch buttress threading). The interior surface 1112 is indicated in a ring surrounding the housing of the electrode 1102 (e.g., the housing 1208 of FIG. 12), including a skirt (unlabeled) that may improve the seal preventing water from leaking out of the vessel 200 and/or leaking into the cap 100 (e.g., the seal 313).

The control interface 1130 comprises a single button 1131 that may be utilized to set the treatment routine, activate and deactivate the ozone generator 102, and/or perform other functions. Similarly, the indicator interface 1140 comprises an LED light (an instance of the indicator light 542) which is capable of visible illumination through a translucent housing for the button (e.g., the housing 1204 as shown in FIG. 12). Together, the control interface 1130 and the indicator interface 1140 may be referred to as the "user interface", e.g., both accepting inputs from a user and generating informational outputs to provide feedback to a user. The exterior surface 1114 is a plastic surface that may be smooth, or may be coated and/or texturized for increased grip by a hand of a user.

An example process for utilizing the cap 1100 will now be described. In the embodiment of FIG. 11, the cap 1100 may be placed on a vessel 200 containing water 101. When the user presses the button 1131, the cap 1100 may exhibit a flashing white light (e.g., from the indicator interface 1140) for three seconds to inform the user that the cap 1100 has been turned on. The indicator light may then cease flashing but remain illuminated at a steady intensity to indicate that the ozonation cap 1100 is in a ready-to-operate state. The user then presses the button again to begin a sanitizing cycle which activates and supplies power to the electrode 1102.

A blue or other colored light (e.g., the indicator light 542 or another indicator light 542) may glow to indicate that the sanitation cycle has begun. That light may also exhibit a slow fade to dark and a slow fade to bright intensity (which may be known as "breathing" or "pulsing" to one skilled in the art of user interface design) to further indicate that the ozonation process has begun and that the ozone 103 is actively being dissolved in the water and/or generated as the ozone gas 203. The sanitation cycle may be timed for the volume of water 101 in the vessel 200. For example, for a 32 oz or 1000 ml bottle size, the timer (e.g., as timed by the timer 506) may be set to 3 minutes. The timer may be pre-set for the water bottle that is employed, and/or may be selected by another type of interaction with the button (e.g., rapidly pressing the button twice) to change water treatment volume. The user may be instructed (e.g., in an instruction manual) to gently mix the water 101 while the ozonation cycle is underway, or to mix the water 101 periodically, to achieve ozone homogeneity in the water 101. Mixing may be accomplished by inverting the bottle and then returning it to upright position several times during the cycle. The user may also be instructed to periodically stop and visually observe clouds of ozone gas being dissolved into the water from the ozone generator 102 (e.g., the electrode 1102). The indicator interface 1140 may be used to provide visual prompts for such mixing (e.g., agitation) and/or observation. At the end of the sanitation cycle, the blue or other color light may cease in order to indicate termination of the cycle to the user. The light may also change color (e.g., green) to indicate the water 101 is considered to be treated (including after any optional waiting period that can also be programmed into the sanitation cycle). The user may then open the bottle (e.g., the combination of the vessel 200 and the cap 1100) and either replace the vessel's standard cap or lid, use the treating water 101, and/or pour the treated water 101 into another container.

The cap 1100 may indicate an operational status and/or an operational state to the user, for example a battery charge state. For example, a yellow light may indicate that the battery is getting low. As the battery charge state gets lower, there may be a red flashing light to indicate that the battery is at the end of its charge life and should be recharged. If the charge state is too low to operate, the red flashing light may continue until the battery is charged or runs out. When the user charges the battery, the indicator light which may glow yellow and begin the "breathing" illumination pattern to indicate that the cap 1100 is charging. When the battery reaches its full charge, the indicator light may change to green, which will notify the user that the charging is complete.

FIG. 12 illustrates a cap structure exploded view of the cap of FIG. 11. The housing 1200 may be a plastic housing having the threading 1110, and two openings that may be shaped through-holes, a first opening for the housing 1204 and a second opening (shown in FIG. 13) for a charging port 1300. The housing 1204 may be a perimeter housing for the button 1206. In one or more embodiments the housing 1204 comprises translucent plastic, rubber, or silicone that may transmit light from an LED on the circuit board 1214 when the cap 1100 is assembled. For example, the LED may line up with the inward facing a cylindrical protrusion on the housing 1204 (unlabeled) to assist in gathering and transmitting light. The button 1206 may be made of plastic or rubber, and may be inset within the housing 1204.

A housing 1208 for the electrode 1102 is inset into the housing 1200 through screws (not shown) or other fasteners breaching or otherwise crossing the seal plate 1212, for example as described below. The electrode 300 is placed into the electrode port 1210, where a portion of the fasteners on the "dry" side of the seal plate 1212 may also be utilized as leads as shown and described in conjunction with the embodiment of FIG. 3 (e.g., the lead 303, the lead 305). The screen 1106 (not shown) may be secured on a collar 1209 of the housing 1208. The seal plate 1212 may be made of plastic, rubber, silicone, or another suitable material and may friction fit to form a watertight seal with an interior partition of the housing 1200, as partially visible in FIG. 13 (e.g., the partition 1302). The seal plate 1212 may be translucent and/or transparent to permit an LED light on the circuit board 1214 to shine through the seal plate 1212 and into the water 101 of the vessel 200, possibly from a single LED light simultaneously illuminating the housing 1204.

The circuit board 1214 as shown may represent an approximate structural representation and/or form factor of a circuit board. It will be recognized by one skilled in the art that a circuit board will comprise multiple electronic components, not shown (e.g., sensors, capacitors, inductors, resistors, processors, integrated circuits, computer memories, batteries, wiring, and/or other components). Finally, a lid 1216 may attach to the housing 1200, for example by mating of a screw-lock mechanism (e.g., an instance of the fastener 1218A) which is to mate with the fastener 1218B of FIG. 13).

FIG. 13 illustrates another cap structure exploded view 1350 of the cap 1100 of FIG. 11, according to one or more embodiments. FIG. 13 further illustrates the second opening in the housing 1200, the charging port 1300 which may permit charging of a battery that may be housed on the circuit board, for example through use of a USB changing port or another suitable charging port. In one or more embodiments, the cap 100 may also be capable of induction charging. FIG. 13 also further illustrates the partition 1302, including an opening (unlabeled) for receiving the seal plate 1212. Also seen in FIG. 13, the lid 1216 includes and/or functions as the resting base 212, as shown and described in FIG. 2.

An example of use of the cap 100 will now be described. Ella is an avid outdoors person who regularly camps and hikes, including overnight backpacking in which Ella carries her tent, sleeping bag, and food to remote wilderness areas. She even occasionally hunts, including in the high desert where water can be scarce. Ella likes to travel as far as possible when she hikes, meaning she prefers to carry less weight and utilize resources she finds along the trail, including water. She has tried many water treatment methods but has found them to be undesirable for various reasons. For example, she does not like the taste imparted to water by chemical treatments such as iodine tablets. She is uncertain about the effectiveness of ultraviolet wands, especially for water that may be murky or contain hearty pathogens. She finds many filters to be heavy and take considerable time and/or strength to pump, especially as the filter begins to get clogged.

Her favorite water purification method while at home or camping out of her car is ozone. Ella likes ozone as a water treatment method because it is a strong, general-purpose oxidizer that can kill viruses, bacteria, nematodes, fungus, and other microbes. Unused ozone also primarily decomposes into oxygen gas, which Ella feels may be safer relative to other chemical treatments based on halogen compounds. However, Ella has not yet found an easy, portable way to ozonate water while she hikes, hunts, or backpacks.

Ella obtains the ozonation cap 1100 (a specific embodiment of the ozonation cap 100). It weighs about 5 ounces. In this example, the ozonation cap 1100 comes with a variety of adapters so the cap 1100 can fit on multiple water bottles and containers Ella already owns. The ozonation cap 1100 was also purchased with an additional accessory, an input cap (e.g., the input cap 400) that allows relatively quick screening and/or filtering of water to be treated with ozone. The indicator interface 1140 clearly communicates operational information (e.g., currently treating water, low battery, etc.). She can also easily control the cap 1100 including initiating water purification with the control interface 1130 which is a simple button (e.g., the button 1131). The internal battery (e.g., the battery 570) is chargeable with a 12V car battery, a wall socket, or even a small folding solar panel.

Ella goes on a backpacking trip in the Sierra Nevada mountains in California. She is exposed to a variety of native water sources while hiking, including reservoirs, snow melt, rivers, and even puddles. Ella adds water to her water bottle (e.g., the vessel 200) to the "1 liter" mark to which the ozonation cap 1100 is calibrated. Ella then attaches the ozonation cap 1100 and turns the ozonation cap 1100 and water bottle upside down and presses the button to start the ozonation treatment cycle. As a safety measure, in one or more embodiments, the ozonation cap 1100 does not activate unless its interior surface (e.g., the interior surface 1112) is in contact with water inside the vessel 200 and/or the inversion is sensed (e.g., through an orientation sensor 512) to ensure ozone will actually be generated in the water and/or sufficient time for ozonation will occur.

The motion of inverting the water bottle causes the water to slosh and increases its internal motion. At the same time, ozone bubbles (e.g., the ozone gas 203) generated by the electrode 1102 flow up from the ozonation cap 1100 (now at the "bottom" of the inverted water bottle). The bubbles are easily visible, giving Ella confidence that the ozonation process is working. In case it is dark when she is purifying water, there is also a light (e.g., the lighting element 316) that illuminates the water in the water bottle such that she can see the bubbles (or even utilize the water bottle as a lantern if needed). During the ozonation process, Ella can leave the inverted water bottle on a stump, hold it while she hikes, or place it into a water-bottle holder in her backpack (which may provide further motion to the water).

The ozonation cap 1100 can flash an indicator light (e.g., the indicator light 542) to indicate to Ella that it is time to gently shake the water bottle for a few moments to ensure the ozone disperses. The indicator light can also change color (e.g., green) when the water has been completely treated.

In one or more embodiments, Ella can choose a simple program to ozonate the water depending on the type of water and/or the volume of water. For example, the ozonation cap 1100 may come with a small chart or grid with "water volume" on an x-axis and "water type" on a y-axis. The chart may specify three volumes (e.g., 500 mL, 1 L, 2 L) and three water types (e.g., clear, discolored, opaque). A cross-reference point between the x-axis and y-axis may specify a number of "clicks" of the button when starting the ozonation cap 1100. For example, 500 mL of "clear" water may only require one click, whereas 2 L of opaque water may require nine clicks. The total number of clicks may correspond to the amount of time and/or agitations required before safely treating the water. This adjustment to the water volume and water type may help to ensure the water is property treated without over-treating, which can save battery life and limit unnecessary human exposure to ozone.

Ella can then flip the water bottle back over, unscrew the cap 1100, and utilize the water. For example, she can: drink the water immediately if thirsty; replace the original cap of the water bottle and save the water for later; let the water off-gas and wait a short period for the ozone to decompose for a better taste and less ozone exposure (e.g., 30 minutes); use the water to clean her equipment; and/or utilize the water immediately as an antiseptic for a cut or abrasion. When Ella occasionally hunts, she can even spray the solution on her clothes to decrease her scent.

Overall, Ella finds the ozonation cap 1100 to be a lightweight, adaptable, and easy to use device and method to generate ozone whether she is car camping, hiking, or hunting. She is able to use the ozonation cap 1100 as her primary water treatment device, as it can treat and/or be adjusted to almost any water source she may encounter.

Another example will now be provided. The United States Navy Sea, Air, and Land (SEAL) Teams, commonly known as Navy SEALs, are the U.S. Navy's primary special operations force and a component of the Naval Special Warfare Command. Among the SEALs' main functions are conducting small-unit special operation missions in maritime, jungle, urban, arctic, mountainous, and desert environments, including areas in which weight is an important factor in mobility and local (e.g., "in situ") resources may have to be utilized. In addition, sickness may be a primary concern from improperly treated water and/or improperly treated wounds. At the same time, battery life, reliability, and consistency may be important for equipment, and especially water treatment equipment.

An embodiment of the cap 100 may include one or more features to maximize the probability of safe water treatment while minimizing battery life. For example, the control interface 530 may permit selection of a water type, a water volume, and/or a water intended use (e.g., wound sterilization), any or all of which may determine an appropriate water treatment program (e.g., the treatment routine 524) in the field for a given water source. Alternatively, or in addition, the water volume and/or water type may be sensed by one or more sensors in the cap 100. For example, the dissolved solids of a water source may be sensed by a dissolved solids sensor 552 and/or a conductivity sensor 554, which may also usable to determine the appropriate treatment program.

In addition, to further reduce battery life and increase the probability of successful treatment, a motion sensor (e.g., the motion sensor 510) may detect motion before and/or during water treatment to ensure a sufficient amount of agitation of the water has occurred so that the ozone sufficiently contacts the entire volume of water. For example, where a SEAL places the water bottle with the cap 1100 into a holder on a backpack while walking, the ozonation time may be reduced due to the agitation of the water as sensed by the motion sensor (and possibly proportionally with the agitation of the water). As a result, the SEALs have a small, multi-purpose tool that can be utilized to efficiently treat many water sources and/or prepare wound treatment.

Although the present embodiments have been described with reference to specific example embodiments, it will be evident that various modifications and changes may be made to these embodiments without departing from the broader spirit and scope of the various embodiments. For example, the various devices, engines, agent, routines, and modules described herein may be enabled and operated using hardware circuitry (e.g., CMOS based logic circuitry), firmware, software, or any combination of hardware, firmware, and software (e.g., embodied in a non-transitory machine-readable medium). For example, the various electrical structure and methods may be embodied using transistors, logic gates, and electrical circuits (e.g., application specific integrated circuitry (ASIC) and/or Digital Signal Processor (DSP) circuitry).

In addition, it will be appreciated that the various operations, processes, and methods disclosed herein may be embodied in a non-transitory machine-readable medium and/or a machine-accessible medium compatible with a data processing system (e.g., the control unit 500). Accordingly, the specification and drawings are to be regarded in an illustrative rather than a restrictive sense.

The structures in the figures such as the engines, routines, and modules may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems.

Features which are described in the context of separate embodiments may also be provided in combination in a single embodiment. Conversely, various features which are, for brevity, described in the context of a single embodiment, may also be provided separately or in any suitable sub-combination. The applicants hereby give notice that new claims may be formulated to such features and/or combinations of such features during the prosecution of the present application or of any further application derived therefrom.

References to "one embodiment," "an embodiment," "example embodiment," "various embodiments," "one or more embodiments," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least one or more embodiments of the invention" includes the stated particular feature, structure, or characteristic.

The enumerated listing of items does not imply that any or all of the items are mutually exclusive, unless expressly specified otherwise.

It is understood that the use of a specific component, device and/or parameter names are for example only and not meant to imply any limitations on the invention. The invention may thus be implemented with different nomenclature and/or terminology utilized to describe the mechanisms, units, structures, components, devices, parameters and/or elements herein, without limitation. Each term utilized herein is to be given its broadest interpretation given the context in which that term is utilized.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smartphone, application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, one or more embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module", "routine", or "system." Furthermore, aspects of the present invention may take the form of a computer program product embodied in one or more computer readable medium(s) having computer readable program code embodied thereon.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "processor" may refer to any device or portion of a device that processes electronic data from registers and/or memory to transform that electronic data into other electronic data that may be stored in registers and/or memory. A "computing platform" may comprise one or more processors.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing the sterilization device and/or the sterilization network according to the present invention will be apparent to those skilled in the art. Various aspects of the invention have been described above by way of illustration, and the specific embodiments disclosed are not intended to limit the invention to the particular forms disclosed. The particular implementation of the loyalty rewards programs may vary depending upon the particular context or application. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A cap for treating water inside a vessel, comprising:
an exterior surface of the cap,
a fastener for attaching the cap to an opening of the vessel,
a power source,
an electrode that generates ozone gas when both the electrode is exposed to the water and a current from the power source is applied to the electrode,
an activation switch that when activated supplies the current to the electrode,
an interior surface of the cap that exposes an anode of the electrode such that the water inside the vessel can contact the anode when the cap is inverted such that the ozone gas rises up through the water of the vessel for increased ozonation effectiveness,
a timer that when expiring stops the current to the electrode,
an indicator light configured to visually indicate at least one of an expiration of the timer, an activation of the electrode, an agitation level of the water, and an operational status of the electrode, and
a lighting element attached to the cap and configured to illuminate the water inside the vessel for visible indication of generation of the ozone gas by the electrode.

2. The cap of claim 1, further comprising:
a proton exchange membrane electrically coupling the anode and a cathode of the electrode to enable ozonation of water having a low electrolyte concentration.

3. The cap of claim 1, further comprising:
at least one of a surface fastener enabling fixation of the cap in an inverted position and a resting base enabling resting of the cap on a level surface in the inverted position.

4. The cap of claim 1, further comprising:
a motion sensor for determining a motion of the cap during treatment of the water inside the vessel, the motion of the cap indicative of an agitation level of the water inside the vessel.

5. The cap of claim 4, further comprising:
an orientation sensor configured to sense at least one of an orientation and a rotation angle of the cap, and
a rotation switch configured to enable the current to be supplied to the electrode upon at least one the orientation and the rotation angle exceeding a threshold rotation angle.

6. The cap of claim 5,
wherein the lighting element automatically illuminates the water upon activation of the electrode,
wherein the fastener is at least one of a threading, a friction fit, and a clasp,
wherein the exterior surface has a grip,
wherein the electrode comprises at least one of nickel-tin oxide and boron-doped diamond,
wherein the lighting element is at least one of set in the interior surface of the cap and configured to shine light through the interior surface of the cap,
wherein the motion sensor comprises an accelerometer,
wherein the power source is a battery, and
wherein the timer can be calibrated to at least one of a water type, an electrolyte concentration, a water conductivity, a dissolved solid concentration, a water volume, and a vessel size.

7. The cap of claim 1, further comprising:
a computer memory comprising computer readable instructions that when executed on a computer processor:
receive a calibration input that is at least one of a water type, a water volume, and a vessel size;
initiate the timer upon an activation of the electrode;
automatically deactivate the electrode upon expiration of the timer;
illuminate a lighting element in response to the activation of the electrode;
determine that a motion value of the cap stored in the computer memory has exceeded a threshold motion value;
activate an indicator to indicate the water of the vessel has achieved an agitation level inferred from the motion value;
determine that a rotation angle at least one of the cap and the vessel has exceeded a threshold rotation value; and
enable the activation of the electrode when the rotation angle of the cap stored in the computer memory has exceeded the threshold rotation value.

8. A bottle for treatment of water, the bottle comprising:
a vessel for holding the water,
a power source,
a cap detachable from the vessel that forms a seal with the vessel when attached, the cap comprising:
an electrode coupled to the power source that generates an ozone when the electrode is exposed to the water and a current from the power source is applied to the electrode,
wherein an anode of the electrode is exposed to an interior of the vessel such that ozone gas propagates into the water of the vessel when the bottle is oriented in an inverted position relative to an opening of the vessel to which the cap is attachable, an activation switch that when activated supplies the current to the electrode, a timer that when expiring stops the current to the electrode, an indicator light configured to visually indicate at least one of expiration of the timer, an activation of the electrode, an agitation level of the water, and an operational status of the electrode, and a lighting element configured to illuminate the water of the vessel for visible indication of generation of the ozone by the electrode.

9. The bottle of claim 8, wherein the lighting element automatically illuminates the water upon the activation of the electrode.

10. The bottle of claim 9, further comprising:

at least one of a surface attachment means and a resting surface permitting the bottle to rest in the inverted position.

11. The bottle of claim 10, wherein the ozone gas rising from the electrode is observable through the vessel.

12. The bottle of claim 11, further comprising:

an output cap detachable from the bottle comprising a catalytic decomposer that decomposes the ozone when the water of the vessel moves through an opening of the output cap, and an input cap detachable from the bottle comprising a filter for filtering the water added to the vessel.

13. The bottle of claim 12, further comprising:

a proton exchange membrane electrically coupling the anode and a cathode of the electrode enabling ozonation of water having a low electrolyte concentration, a motion sensor for determining motion of the cap during treatment of the water of the vessel to indication agitation of the water, a rotation switch configured to enable the current to be supplied to the electrode upon the cap achieving a rotation angle exceeding a threshold rotation angle, a vent openable in the bottle configured to vent at least one of the ozone and a hydrogen produced by the electrode when the bottle is in the inverted position, and wherein the cap comprises a grip, wherein the electrode comprises at least one of nickel-tin oxide and boron-doped diamond, wherein the lighting element is at least one of set in an interior surface of the cap and configured to shine light through the interior surface of the cap, wherein the motion sensor comprises an accelerometer, wherein the power source is a battery, and wherein the timer can be calibrated to at least one of a water type, a water volume, and a vessel size.

14. A method for treatment of water, the method comprising:

attaching to a vessel containing water to a cap comprising an electrode coupled to a power source capable of generating an ozone when the electrode is exposed to the water and a current is applied to the electrode;

initiating through execution of computer readable instructions on a computer processor a timer upon an activation of the electrode;

rotating the vessel until the water contacts an anode of the electrode;

activating the electrode by applying the current from the power source to generate ozone gas that rises while the vessel remains rotated;

automatically deactivating through execution of computer readable instructions on a computer processor the electrode upon expiration of the timer; and illuminating the water in the vessel through execution of computer readable instructions on a computer processor in response to generation of the ozone gas rising in the vessel when the vessel is rotated, wherein illuminating the water in the vessel comprising illumination from a lighting element that is at least one of set in an interior surface of the cap and configured to shine light through the interior surface of the cap.

15. The method of claim 14, further comprising:

activating a first indicator to visually indicate at least one of expiration of the timer, the activation of the electrode, and an operational status of the electrode.

16. The method of claim 15, wherein the timer can be calibrated to at least one of the water type, the water volume, and the vessel size.

17. The method of claim 16, further comprising:

determining through execution of computer readable instructions on a computer processor that a motion value of the cap stored in a computer memory has exceeded a threshold motion value;

activating through execution of computer readable instructions on a computer processor at least one of the first indicator and a second indicator to indicate the water of the vessel has achieved an agitation level inferred from the motion value;

determining through execution of computer readable instructions on a computer processor that a rotation angle of the cap stored in the computer memory has exceeded a threshold rotation value; and enabling the activation of the electrode when the rotation angle of the cap stored in the computer memory has exceeded the threshold rotation value.

18. The method of claim 17, further comprising:

receiving through execution of computer readable instructions on a computer processor a calibration input that is at least one of a water type, a water volume, and a vessel size.

19. The method of claim 18, further comprising:

filtering an input water transferring into the vessel; and catalytically decomposing at least a portion of the ozone in water transferring out of the vessel.

20. The method of claim 19, further comprising:

venting hydrogen gas from the vessel, wherein the electrode comprises at least one of nickel-tin oxide and boron-doped diamond, wherein the motion value is sensed with an accelerometer, wherein a catalytic decomposition of the a catalytic decomposer comprises passing the water through a mesh comprising at least one of platinum and palladium, wherein the power source is a battery.

* * * * *